US011283710B2

(12) United States Patent
Iwasaki

(10) Patent No.: US 11,283,710 B2
(45) Date of Patent: Mar. 22, 2022

(54) MULTI-FUNCTIONAL DEVICE FOR COMMUNICATIONS NETWORKS AND METHODS AND SYSTEMS UTILIZING SAME

(71) Applicant: Sean Iwasaki, Chicago, IL (US)

(72) Inventor: Sean Iwasaki, Chicago, IL (US)

( * ) Notice: Subject to any disclaimer, the term of this patent is extended or adjusted under 35 U.S.C. 154(b) by 14 days.

(21) Appl. No.: 17/004,299

(22) Filed: Aug. 27, 2020

(65) Prior Publication Data

US 2021/0051099 A1 Feb. 18, 2021

Related U.S. Application Data

(63) Continuation-in-part of application No. 16/917,475, filed on Jun. 30, 2020, which is a continuation-in-part of application No. 16/839,260, filed on Apr. 3, 2020, and a continuation-in-part of application No. 16/415,899, filed on May 17, 2019, now Pat. No. 10,985,440, said application No. 16/839,260 is a continuation of application No. 15/687,862, filed on Aug. 28, 2017, now Pat. No. 10,637,776, said application No. 16/415,899 is a continuation of
(Continued)

(51) Int. Cl.
| *H04L 12/773* | (2013.01) |
| *H04L 12/933* | (2013.01) |
| *H04L 12/935* | (2013.01) |
| *H04L 12/931* | (2013.01) |
| *G02B 6/42* | (2006.01) |
| *G02B 6/44* | (2006.01) |
| *H04L 45/60* | (2022.01) |
| *H04L 49/35* | (2022.01) |
| *H04L 49/00* | (2022.01) |
| *H04L 49/109* | (2022.01) |

(52) U.S. Cl.
CPC ............ *H04L 45/60* (2013.01); *H04L 49/109* (2013.01); *H04L 49/30* (2013.01); *H04L 49/355* (2013.01)

(58) Field of Classification Search
CPC ....... H04L 45/60; H04L 49/109; H04L 49/30; H04L 49/355
See application file for complete search history.

(56) References Cited

U.S. PATENT DOCUMENTS

| 2007/0086792 A1* | 4/2007 | Regev ................. H04B 10/697 398/209 |
| 2017/0195184 A1* | 7/2017 | Huang ................ H04L 41/0806 |

FOREIGN PATENT DOCUMENTS

EP 3764567 A1 * 1/2021 ......... H04Q 11/0062

* cited by examiner

*Primary Examiner* — Harry H Kim
(74) *Attorney, Agent, or Firm* — Charlas T. Riggs, Jr.

(57) ABSTRACT

The present subject matter relates to methods, circuitry and equipment providing a multi-functional, cost effective, media independent, open platform device for communication services using differential signaling interfaces. The methods, circuitry and equipment comprise a plurality of input amplifiers, output amplifiers, and retimers. A non-blocking cross-point switch may be used to switch any differential signals from the cross-point switch input to output. The device aggregates communication services from a plurality of lower service capacity connectors and interfaces to a single higher capacity connector and interfaces. The device can establish a demarcation point with a single device capable of supporting any communication services, any physical media interfaces, from any location.

16 Claims, 21 Drawing Sheets

Related U.S. Application Data application No. 15/294,858, filed on Oct. 17, 2016, now Pat. No. 10,446,909.

(60) Provisional application No. 62/905,852, filed on Sep. 25, 2019, provisional application No. 62/381,168, filed on Aug. 30, 2016, provisional application No. 62/243,957, filed on Oct. 20, 2015.

MULTI-FUNCTIONAL DEVICE FOR COMMUNICATIONS NETWORKS AND METHODS AND SYSTEMS UTILIZING SAME

RELATED APPLICATION(S)

This application is a continuation in part of U.S. application Ser. No. 16/917,475 entitled Circuitry for Demarcation Devices and Methods Utilizing Same, filed Jun. 30, 2020, which is a continuation-in-part of U.S. application Ser. No. 16/839,260 entitled Multi-functional Circuitry for Communications Networks and Methods and Devices Utilizing Same, filed Apr. 3, 2020, which is a continuation of U.S. application Ser. No. 15/687,862 entitled Multi-functional Circuity for Communications Networks and Methods and Devices Utilizing Same, filed Aug. 28, 2017, now U.S. Pat. No. 10,637,776 issued Apr. 28, 2020, and which claims priority to U.S. Provisional Application Ser. No. 62/381,168 filed Aug. 30, 2016, the entire disclosures of which are herein incorporated by reference. This application is also a continuation-in-part of U.S. application Ser. No. 16/415,899 entitled Small Form Factor Pluggable Unit with Wireless Capabilities, filed May 17, 2019, which is a continuation of U.S. application Ser. No. 15/294,858 entitled Small Form Factor Huggable Unit with Wireless Capabilities, filed Oct. 17, 2016, now U.S. Pat. No. 10,446,909 issued on Oct. 15, 2019, and which claims priority to Provisional Application Ser. No. 62/243,957 filed Oct. 20, 2015, the entire disclosures of which are herein incorporated by reference. This application also claims priority to Provisional Application Ser. No. 62/905,852 filed Sep. 25, 2019, the entire disclosure of which is herein incorporated by reference.

BACKGROUND

A breakout or fanout cable is an optical fiber (fiber) or wire connectorized cable assembly containing a high-density connector attached to several insulated cables bundled together in a single outer jacket, a jacketed cable bundle. The jacketed cable bundle then splits or separates into several individual jacketed cables where each jacketed cable is attached to a connector. Breakout cables can be passive optical fiber or wire passive or active wire design. Breakout cables are an economical and effect solution to replace equipment patch panels and fiber splice connector box, and installation time and material. Breakout cable assemblies are most commonly used to consolidate and organize individual fiber patch cables between and within a network by reducing the physical size and clutter with large quantities of patch cables. Optical fiber breakout cables available with LC, SC, and ST fiber connectors attached to the individual jacketed fiber cable, as well as support for Single-Mode (OS2) and Multimode (OM1, OM2, OM3, & OM4) fiber specifications, and lengths from 1 to 100 meters. The wire and fiber cables design and jacket material and construction vary per user application and installation environment. Break out cable jacket material may have standard riser (OFNR) or fire-retardant Plenum (OFNP) insulation for additional protection against fire. The breakout jacket may be reinforced with specialty jacketing, such as an armored jacket, for additional protection and deployment in previously uninhabitable areas.

By way of further background, small Form-factor Pluggable (SFP) devices are standardized, hot-pluggable devices used to provide communication services for the communication market. The SNIA SFF Technology Affiliate (TA) Small Form Factor (SFF) and various other Multi Source Agreement (MSA) Committees defines the mechanical, electrical, and software specifications of the SFP device to ensure interoperability among SFP devices and chassis. SFF Committee document INF-80741 Rev 1.0 provide specifications for SFP (Small Form Factor Pluggable) Transceiver, SFF-8431 Rev 4.1 provide specifications for SFP+ 10 Gb/s and Low Speed Electrical Interface provide specifications for SFP+ devices, SFF-8402 Rev 1.1 provide specification for SFP+ 1X 28 Gb/s Pluggable Transceiver Solution (SFP28), SFF-8436 Rev 4.9 provides specification for QSFP+ 4X 10 Gb/s Pluggable Transceiver, SFF-8665 Rev 1.9 provide specifications for QSFP+ 28 Gb/s 4X Pluggable Transceiver Solution (QSFP28). QSFP-DD Hardware Rev 5.1 provide specifications for QSFP Double Density 8X Pluggable Transceiver, and OSFP Module Specification Rev 3.0 provide specifications for OSFP Octal Small Form Factor Pluggable Module represent a few of the specifications for SFP transceiver devices. These documents also reference other documents providing specifications for the associated SFP transceiver cage and connector. SFP devices are designed to be inserted within a cage, which the cage is attached to the communication equipment circuit assembly. An example of this cage SFF Committee document SFF-8432 Rev 5.1 SFP+ provides specifications for the SFP+ module and cage. SFP devices are available with different exterior connectors for various applications. SFP devices are available with coaxial connectors, SC/LC optical connectors, and RJ modular jack types connectors.

SFF Committee document SFF-8472 Rev 12.3 Diagnostic Monitoring Interface for Optical Transceivers and SFF-8636 Rev 2.10a provide specifications for the Management Interface for 4-lane Modules and Cables provide specifications on the SFP device's identity, status, and real-time operating conditions. These documents and other documents listed above describes a register and memory map which provides alarms, warnings, vendor identity, SFP description and type, SFP real time diagnostic, and vendor specific registers. This information is to be used by the SFP host equipment.

Due to its small and portable physical size, SFP Devices have expanded in specifications to address other applications. SFP Devices are represented as SFP, SFP+, SFP28, QSFP, QSFP+, QSPF28, QSFP-DD, OSPF, and all other current and future SFF and MSA technologies. SFP Devices are standardized among equipment vendors and network operators to support interoperability. Due to the low cost, size, and interoperability, SFP Devices are used extensively in all communication service applications.

By way of still further background, the telecommunication service and network have significantly evolved towards communication equipment providing an extremely high service capacity in a smaller mechanical form factor. At present the capacity these very high capacity communication equipment can support is challenged with managing power usage and heat dissipation, which involve service restrictions, QSFP and SFP device usage restrictions, and equipment installation restrictions. The extremely high service capacity communication equipment will require using lower power QSFP and SFP devices to manage the power usage and heat dissipation. These lower power QSFP and SFP devices do not support long distance transmission, higher transmission rates, or other media applications.

By way of still further background, the telecommunication service and network still support a variety of communication services and technologies. The Service Provider must still manage the deployment of legacy to state-of-the-art communication services and their associated communication equipment, which typically involve different communication service interfaces and physical media. The Service Provider use of very compact state-of-the art communication equipment with high density connectors further consolidates the deployment of services at the Demarcation Point. The Demarcation point establishes the boundaries which define privacy, ownership, and responsibilities between the Service Provider and their Customer. The Service Provider typically deploys different equipment at different locations, which complicates the Demarcation Point.

One example of a prior art breakout cable assembly is illustrated in the diagram of FIG. 1 (prior art). A QSFP to four LC fiber breakout Cable 900 comprises a QSFP Connector 908 attached to jacketed Cable 906 bundle at one-end and four fiber LC Connectors 902a, 902b, 902c, and 902d each connector attached to the individual jacketed cable 904a, 904b, 904c, 904d. The QSFP Connector 908 is an active device which supports eight fiber cables, where eight fiber cables are partitioned into four jacketed Cables 904a, 904b, 904c, and 904d. Cables 904a, 904b, 904c, and 904d are each comprised of two fiber cables, specifically a transmit and receive fiber cable. The Cables 904a, 904b, 904c, and 904d are each connected to fiber LC Connectors 902a, 902b, 902c, and 902d.

There are a number of disadvantages to this type of breakout cable assembly 900. This breakout fiber cable has a fixed cable length and cannot provide the flexibility of supporting different fiber cable lengths for the bundled Cable 906 or individual Cable 904a, 904b, 904c, or 904d. This fiber breakout Cable 900 is designed with a specific cable type and material, such as multimode fiber for indoor applications. If the communication service application requires an outdoor long distance application, a fiber breakout Cable 900 designed using an armored jacketed single mode fiber would be required. Still further, the prior art Cable 900 Connectors 902a, 902b, 902c, and 902d can only connect to communication equipment with LC fiber connectors. There may be applications which require RJ45, coax, or wireless interfaces.

Another example of a prior art breakout cable assembly is illustrated in the diagram of FIG. 2 (prior art). A QSFP+ to SFP+ breakout Cable 910 comprises a QSFP Connector 918 attached to jacketed Cable 916 bundle at one-end and four SFP Connectors 912a, 912b, 912c, and 912d each SFP connector attached to the individual jacketed cable 914a, 914b, 914c, 914d. The QSFP Connector 918 is an active device which supports eight fiber cables, where eight fiber cables are partitioned into four jacketed Cables 914a, 914b, 914c, and 914d. Cables 914a, 914b, 914c, and 914d are each comprised of two fiber cables, specifically a transmit and receive fiber cable. The Cables 914a, 914b, 914c, and 914d are each connected to active SFP Connectors 912a, 912b, 912c, and 912d.

There are a number of disadvantages to this type of breakout cable assembly 920. This breakout fiber cable has a fixed cable length and cannot provide the flexibility of supporting different fiber cable lengths for the bundled Cable 916 or individual Cable 914a, 914b, 914c, or 914d. This fiber breakout Cable 910 is designed with a specific cable type and material, such as multimode fiber for indoor applications. If the communication service application requires an outdoor long cable length application, a fiber breakout Cable 910 designed using an armored jacketed extended length single mode fiber would be required. Still further, the prior art Cable 910 Connectors 912a, 912b, 912c, and 912d can only connect to communication equipment with SFP connectors. There may be applications which require RJ45, coax, or wireless interfaces.

Another example of a prior art breakout cable assembly is illustrated in the diagram of FIG. 3 (prior art). A QSFP-DD to SFP28 breakout Cable 920 comprises a QSFP-DD Connector 928 attached to jacketed Cable 926 bundle at one-end and eight SFP Connectors 922a, 922b, 922c, 922d, 922e, 922f, 922g, and 922h each SFP connector attached to the individual jacketed cable 924a, 924b, 924c, 924d, 924e, 924f, 924g, and 924h. The QSFP-DD Connector 928 is an active device which supports sixteen fiber cables, where the sixteen fiber cables are partitioned into eight jacketed Cables 924a, 924b, 924c, 924d, 924e, 924f, 924g, and 924h. Cables 924a, 924b, 924c, 924d, 924e, 924f, 924g, and 924h are each comprised of two fiber cables, specifically a transmit and receive fiber cable. The Cables 924a, 924b, 924c, 924d, 924e, 924f, 924g, and 924h are each connected to active SFP Connectors 922a, 922b, 922c, 922d, 922e, 9221, 922g, and 912h.

There are a number of disadvantages to this type of breakout cable assembly 920. This breakout fiber cable has a fixed cable length and cannot provide the flexibility of supporting different fiber cable lengths for the bundled Cable 926 or individual Cable 924a, 924b, 924c, 924d, 924e, 924f, 924g or 924h. This fiber breakout Cable 920 is designed with a specific cable type and material, such as multimode fiber for indoor applications. If the communication service application requires an outdoor long distance application, a fiber breakout Cable 920 designed using an armored jacketed single mode fiber would be required. Still further, the prior art Cable 910 Connectors 924a, 924b, 924c, 924d, 924e, 924f, 924g, and 924h can only connect to communication equipment with SFP connectors. There may be applications which require RJ45, coax, or wireless interfaces.

Still another example of a prior art breakout cable assembly is illustrated in the diagram of FIG. 4 (prior art). A MPO to LC breakout Cassette 930 comprises a MPO Receptable 938 attached to Cable 936 bundle at one-end and four fiber LC Receptables 932a, 932b, 932c, and 932d each fiber LC receptable attached to the individual cable 934a, 934b, 934c, and 934d. The MPO Receptable 938 is a passive device which supports eight fiber cables, where the eight fiber cables are partitioned into four fiber Cables 934a, 934b, 934c, and 934d. Cables 934a, 934b, 934c, and 934d are each comprised of two fiber cables, specifically a transmit and receive fiber cable. The Cables 934a, 934b, 934c, and 934d are each connected to the fiber LC Receptacles 932a, 932b, 932c, and 932d.

There are a number of disadvantages to this type of breakout Cassette 930. This breakout Cassette 930 uses fixed fiber LC connectors and cannot interface other physical media interfaces such as RJ45, coax, or wireless. The breakout Cassette 930 is a passive device, which will restrict the length of fiber cables connected to the fiber LC Receptables 932a, 932b, 932c, and 932d and the MPO Receptable 938.

The following references provide general background information regarding the subject matter hereof, and each are herein incorporated by reference:

U.S. Pat. No. 8,406,587 B2 titled Quad Small Form Factor Pluggable (QSFP) Adapter Module, issued to Mudd, et al. on Mar. 26, 2013.

U.S. Pat. No. 9,100,123 B2 titled QSFP To 4X10GBase-T Converter Cable Assembly, issued to Tang, et al. on Aug. 4, 2015.

U.S. Pat. No. 6,975,209 B2 titled In-Line Power Tap Device for Ethernet Data Signal, issued to Gromov on Dec. 13, 2005.

U.S. Patent Application Publication No. 2004/0062498 A1 titled Optical Polarity Modules And Systems, published to Del Grosso et al. on Apr. 1, 2004.

U.S. Patent Application Publication No. 2016/0342563 A1 titled Converter Module, published to Tomada on Nov. 24, 2016.

SUMMARY

In a preferred embodiment, the Communications Network Device of the present disclosure is a flexible and applicable device for facilitating communication services from complex and diverse networks. This Device, which aggregates communication services from a plurality of lower service capacity connectors and interfaces to a single higher capacity connector and interfaces, is designed to use industry standard devices and technology, namely small pluggable devices and differential signaling. In turn, the Device has many advantages over prior art and many new advantages to address issues confronting present and future Networks.

The Device is especially useful to aggregate different communication services from communication equipment in different locations by accepting different communication service, different physical media connector interfaces, and any cable types, cable material, and/or cable lengths. The Device allows for the ability to change or repair communication services by replacing the SFP devices and/or associated cabling.

The methods, systems, devices, circuitry and equipment of the present disclosure have the ability to provide independent media conversion on each of the SFP devices. The Device can support different physical media interfaces media such as fiber, coax, wire, and wireless by using SFP and QSFP devices. The Device allows the physical media interface connectors to be changed by replacing the SFP or QSFP devices.

The methods, systems, Devices and Circuity disclosed herein allow the Network to change service paths between a low to a high density port connectors. The Device uses a non-blocking cross-point switch to switch any differential signals from the cross-point switch input to output. The Device has the ability to change communication service paths, allowing the Network flexibility to offer new or change communication services within a Network or at a Network Demarcation Point. The Device is also able to provide communication service redundancy by switching communication paths between the Device's ports.

The methods, systems, Devices and Circuity disclosed herein are designed to have very low latency between the Device's ports to address applications involving 5G or latency sensitive networks. The Device realizes very low latencies by using differential paths between the Device's functional blocks. The Device design of differential signaling paths between functional blocks yields very low latency through the Device. The Device low latency of 350 ps or lower for future Networks, namely 5G use of differential signaling provides a low latency.

The methods, systems, Devices and Circuity of the present disclosure can establish a Demarcation Point through an SFP Device or the Device SFP Port. The SFP Device can provide the Demarcation Point with a wired, coax, optical, or wireless interface with the appropriate SFP Device. Alternately, the methods, systems, Devices and Circuitry of the present disclosure can establish a Demarcation Point through an SFP Port. In one embodiment, the Device Port is the Demarcation Point and the SFP Device is the responsibility of the other Network. The methods, systems, Devices and Circuity of the present disclosure can establish a Demarcation Point with a single device capable of supporting any communication services, any physical media interfaces, from any location.

The methods, systems, Devices and Circuity of the present disclosure can also establish an Extended Demarcation Point for communication service. The present disclosure can provide an extended Demarcation point by installing the Device further within the Second Network and using the SFP devices as the Extended Demarcation Point. The Device functionality in small mechanical size offers the Second Network the advantages of installing the Device anywhere.

The methods, systems, Devices and Circuity of the present disclosure can also allow another communication equipment to manage heat dissipation and power usage by having the other communication equipment to use lower power QSFP and SFP type devices. SFP28, QSFP+, QSFP28, QSFP-DD, OSFP devices can each dissipate up to 15 W or greater for long distance transmission. On high capacity communication equipment heat dissipated can be over 1000 W, which this amount of power and heat can prevent the installation of other communication equipment within the same communication equipment rack or enclosure. The Device can function as an intermediate device, where the Device installs these extended range SFP and QSFP devices to provide the long distance transmission to the other Network. The Device in turn will connect to the communication equipment using lower power SFP or QSFP Device or cabling.

The Device of the present disclosure is also provided with remote testing capabilities, allowing for the provision of testing of the communication services. Existing prior art devices are not designed to have remote loopback testing capabilities and provide performance monitoring capabilities. The Device of the present disclosure includes the ability to perform intrusive loopback testing to verify the communication services. These remote testing and performance monitoring capabilities will allow the Service Providers to address the maintenance and troubleshooting of communication services remotely, i.e., without local presence. The ability to provide performance monitoring and testing will increase the reliability and quality of the service of the Device.

The methods, systems, devices, circuitry and equipment of the present disclosure has the ability to identify, provide status, provision, and test the SFP devices and the communication services using loopbacks. As previously discussed, the SFP devices are designed to be compliant to the industry standard SFF-8472 digital diagnostics monitoring (DDM) functions which define management specifications on the SFP identity, status, provisioning, and other vendor specific information and controls. The Device accesses the DDM information from the SFP device through a serial communication interface Inter-Integrated Circuit (I2C). This I2C interface is low speed serial communication protocol implemented using two electrical signals, which the electrical signal interface is located at the SFP device printed circuit board edge connector of the Device.

The methods, systems, Devices, and Circuity of the present disclosure can also provide security to the SFP and QSFP type devices, cable, and associated communication services by restricting access. When the Device is installed in a communication equipment rack, the Device placement of the Service Provider's SFP or QSFP housing at the rear of the Device restricts access to the SFP or QSFP device, the attached cabling, and the associated signaling. In another embodiment, the Service Provider's SFP or QSFP housing at the front of the Device restricts access to the SFP or QSFP device by way of a cover to prevent the removal of SFP or QSFP device and cabling.

DETAILED DESCRIPTION

Figure 1:
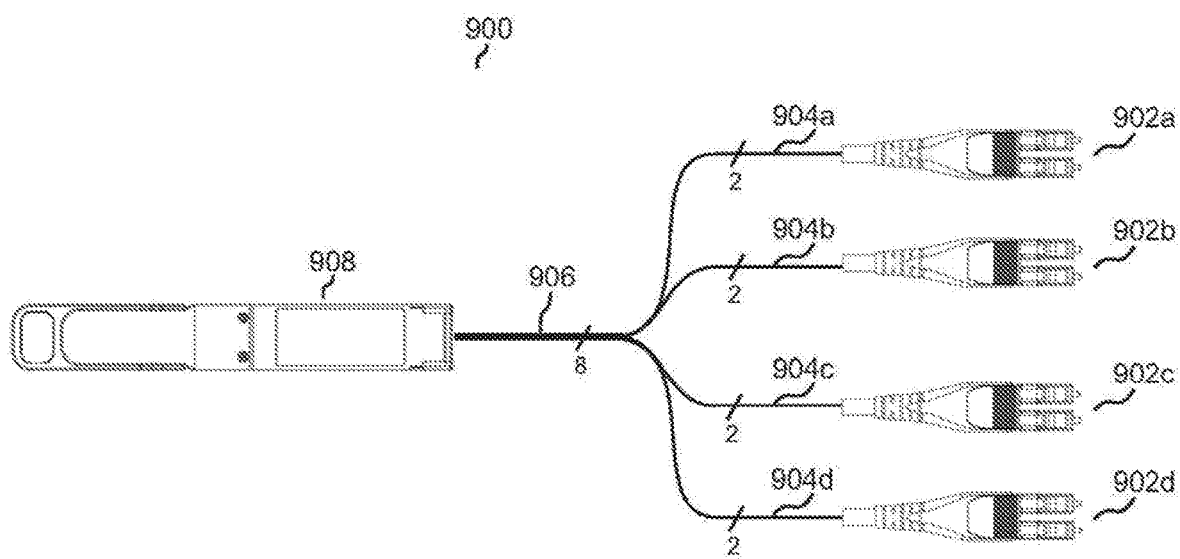
FIG. 1 is a diagram illustrating a prior art fiber breakout cable assembly connectorized with a QSFP+ housing and four fiber LC connectors.
Figure 2:
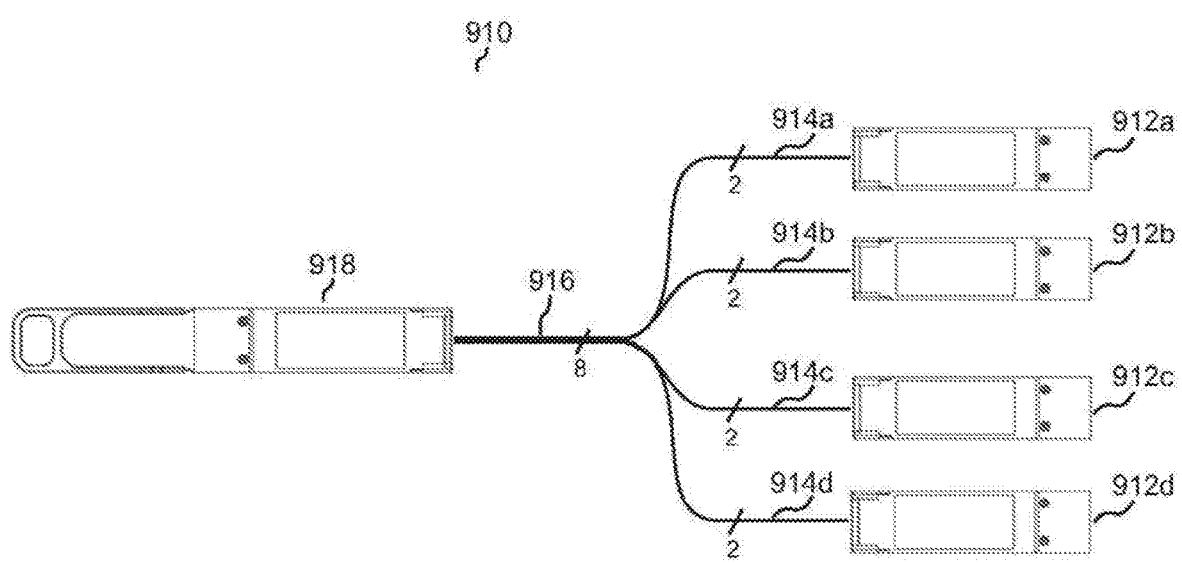
FIG. 2 is a diagram illustrating a prior art connectorized wired breakout cable assembly connectorized with a QSFP+ housing and four SFP+ housings.
Figure 3:
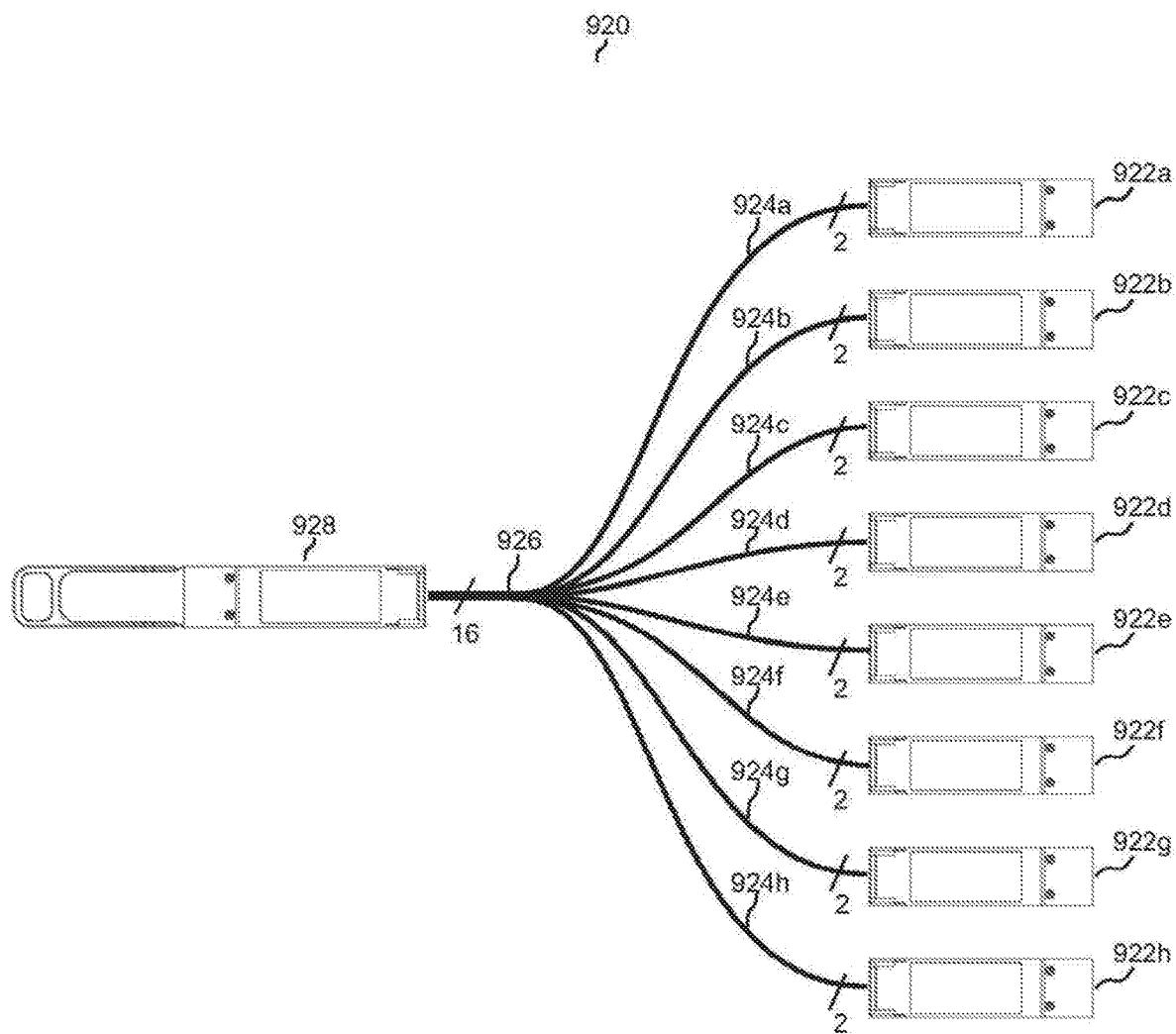
FIG. 3 is a diagram illustrating a prior art fiber connectorized breakout cable assembly connectorized with a QSDP-DD housing and eight SFP+ housings.
Figure 4:
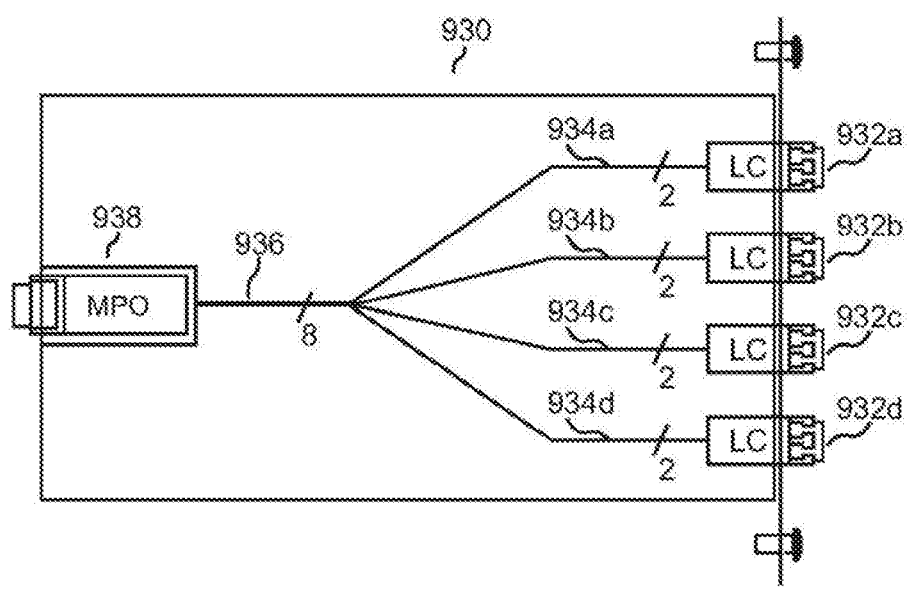
FIG. 4 is a diagram illustrating a prior art fiber cassette device comprised with a fiber MPO receptacle and four fiber LC receptacles.

The methods, systems, Devices, Circuitry and equipment of the present disclosure provide numerous advantages, novel features and/or improvements in providing various communication services and associated testing and maintenance for establishing a Demarcation for communication networks, including but not limited to providing the functionality of service monitoring via wireless. Discussed below and shown in the drawings are some of these advantages, novel features and/or improvements. Additional advantages, novel features and/or improvements will become apparent to those skilled in the art upon examination of the disclosure herein and the accompanying drawings, or may be learned by production or operation of the examples.

Figure 5:
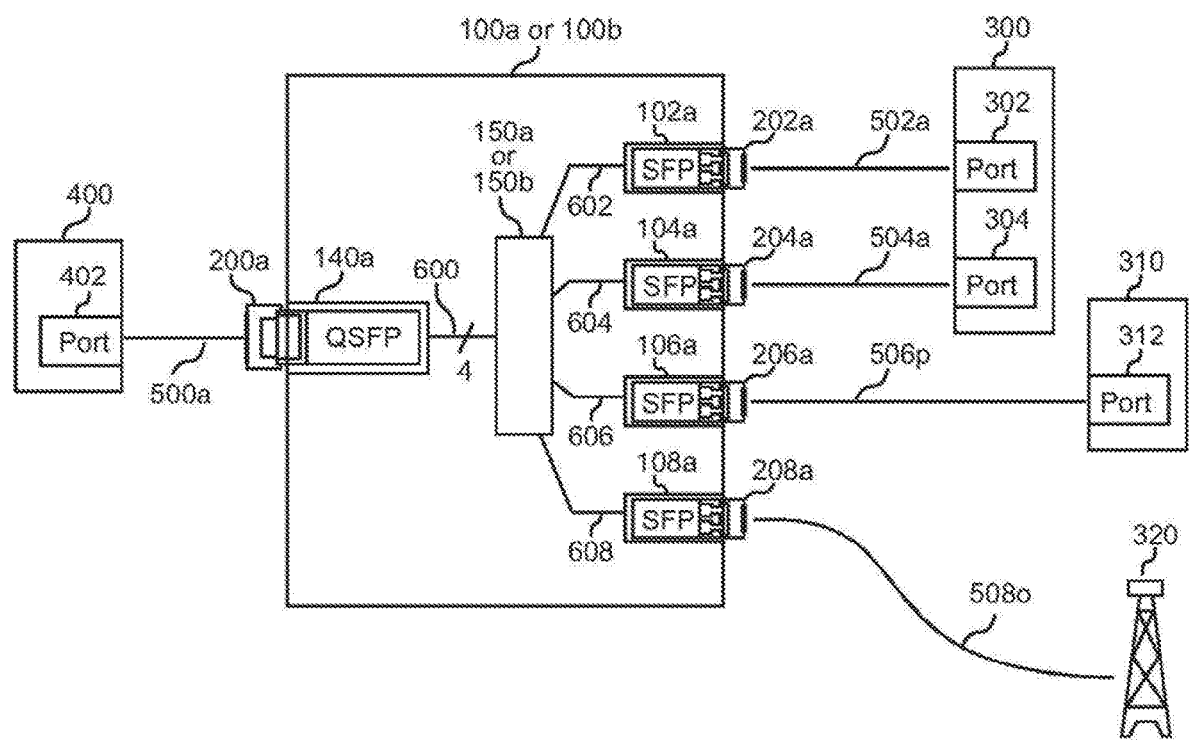
FIG. 5 is a block diagram illustrating methods, systems, devices, circuitry and equipment of the present disclosure used to aggregate communication services between a communication device having a QSFP+ port and two communication equipment and a Tower, utilizing four SFP+ ports.

FIG. 5 illustrates a diagram of an embodiment of the communications system and equipment of the present disclosure, wherein a Device 100a (if with circuitry 150a) or 100b (if with circuitry 150b) interfaces four communication service, two communication services from Communication Equipment 300, one communication service from. Communication Equipment 310, and one communication service from Communication Tower 320. The Device 100a or 100b then aggregates the four communication services for transmission to Communication Equipment 400 by way of a single QSFP Device 200a. This embodiment allows the use of different cabling types, cable lengths, and the ability to change and replace any cable or SFP and QSFP type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power SFP, SFP+, SFP28, SFP56, QSFP, QSFP+, and QSFP28 devices.

Figure 16:
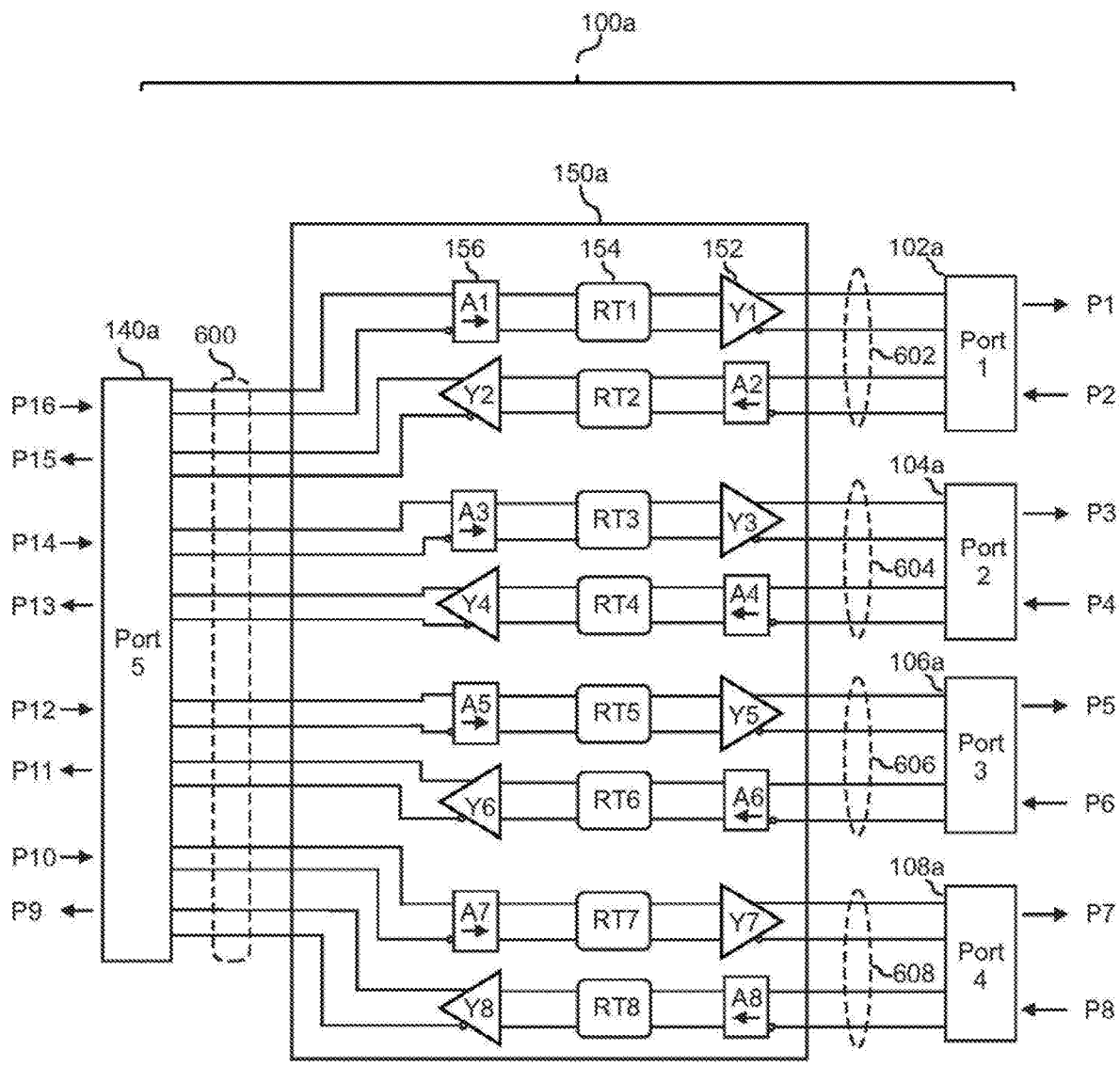
FIG. 16 is a schematic diagram illustrating methods, systems, devices, circuitry and equipment of the present disclosure having circuitry used to amplify, equalize, and retime differential signal paths between a QSFP+ device and four SFP+ devices.
Figure 17:
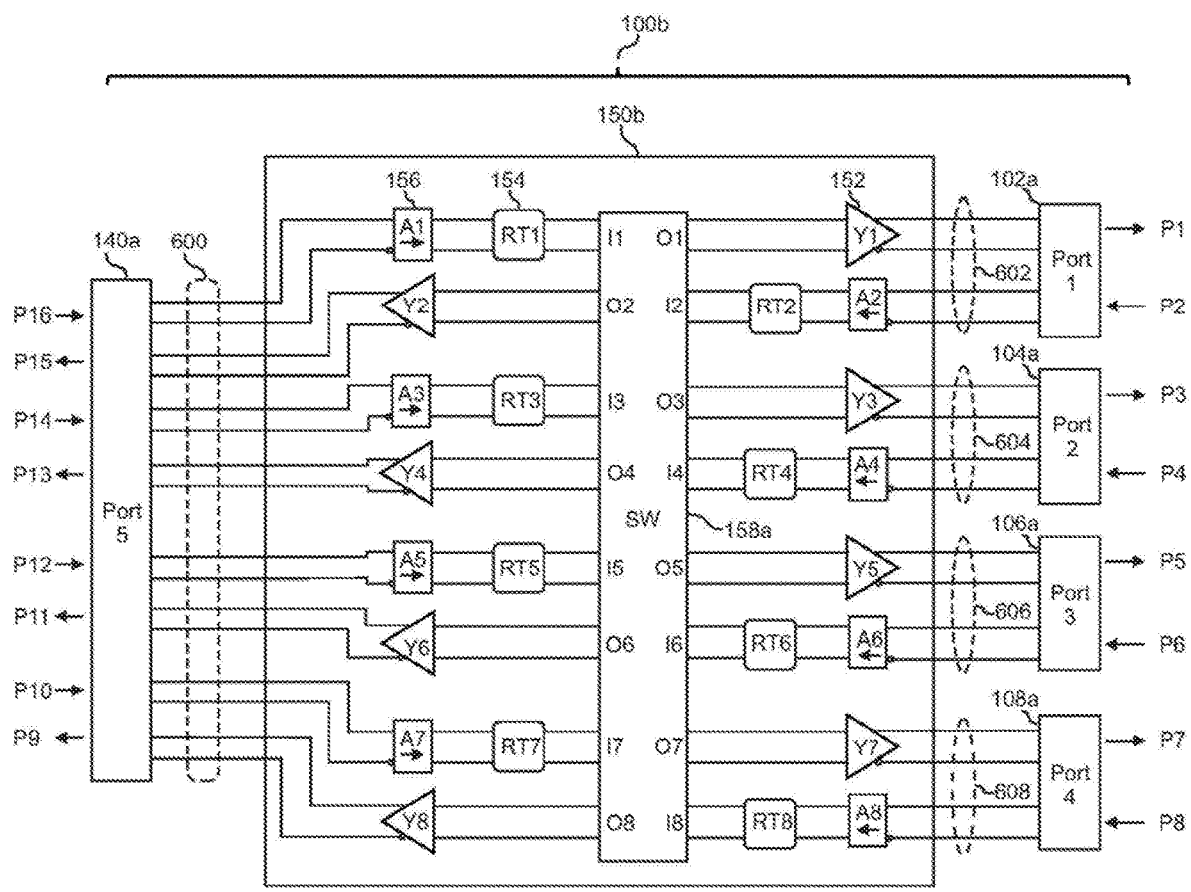
FIG. 17 is a schematic diagram illustrating the methods, systems, devices, circuitry and equipment of the present disclosure having circuitry used to amplify, equalize, retime, and switch differential signal paths between a QSFP+ device and four SFP+ devices.

As illustrated in FIG. 5, the Network is comprised of a Device 100a or 100b having five Ports 102a, 104a, 106a, 108a, and 140a, Communication Equipment 300 having two Ports 302, 304, Communication Equipment 310 having one Port 312, a wireless Communication Tower 320 and Communication Equipment 400 having one Port 402. Cables 500a, 502a, 504a, 506p, and 508o can individually vary in length, type, and material for the given application. The individual cables can be replaced for repair or application changes. The Device 100a or 100b has a SFP Device 202a connected to Port 102a, a SFP Device 204a connected to Port 104a, a SFP Device 206a connected to Port 106a, a SFP Device 208a connected to Port 108a, and a QSFP Device 200a connected to Port 140a. The Device 100a or 100b has Paths 602, 604, 606, and 608 which define transmit and receive differential signal paths between the SFP Ports 102a, 104a, 106a, and 108a and Circuitry 150a or 150b of the Device. Path 600 defines four transmit and receive differential signal paths between the QSFP Port 140a and Circuitry 150a and 150b of the Device. The Circuitry 150a or 150b is comprised of input and output differential amplifiers and retimers through differential signal paths, as shown and discussed in more detail with respect to FIGS. 16 and 17 respectively. Device 100a has Circuitry 150a whereas Device 100b has Circuitry 150b. The Circuitry 150b of Device 100b has a cross-connect switch which provides non-blocking cross-connects between all Paths. Further details on Circuitry 150a and 150b are illustrated in FIGS. 16 and 17, respectively.

Two fiber Cables 502a and 504a are used to interface the communication services between Communication Equipment 300 and Device 100a or 100b, specifically connecting the fiber Cable 502a from SFP Device 202a in Port 102a of Device 100a or 100b to Port 302 of the Communication Equipment 300, and connecting the fiber Cable 504a from SFP Device 204a in Port 104a to Port 304 of the Communication Equipment 300. A flame retardant plenum Cable 506p is used to interface the communication service between Communication Equipment 310 and Device 100a or 100b, specifically connecting the plenum Cable 506p from SFP Device 206a in Port 106a of Device 100a or 100b to Port 312 of Communication Equipment 310. An outside armored fiber Cable 508o is used to interface the communication services between the Communication Tower 320 and Device 100a or 100b, specifically connecting the outdoor fiber Cable 508o from SFP Device 208a in Port 108a of Device 100a or 100b to the Communication Tower 320. The Device 100a or 100b in turn connects to the Communication Equipment 400 through a fiber Cable 500a, specifically connecting the QSFP Device 200a in Port 140a of Device 100a or 100b to Port 402 of the Communication Equipment 400.

Figure 6:
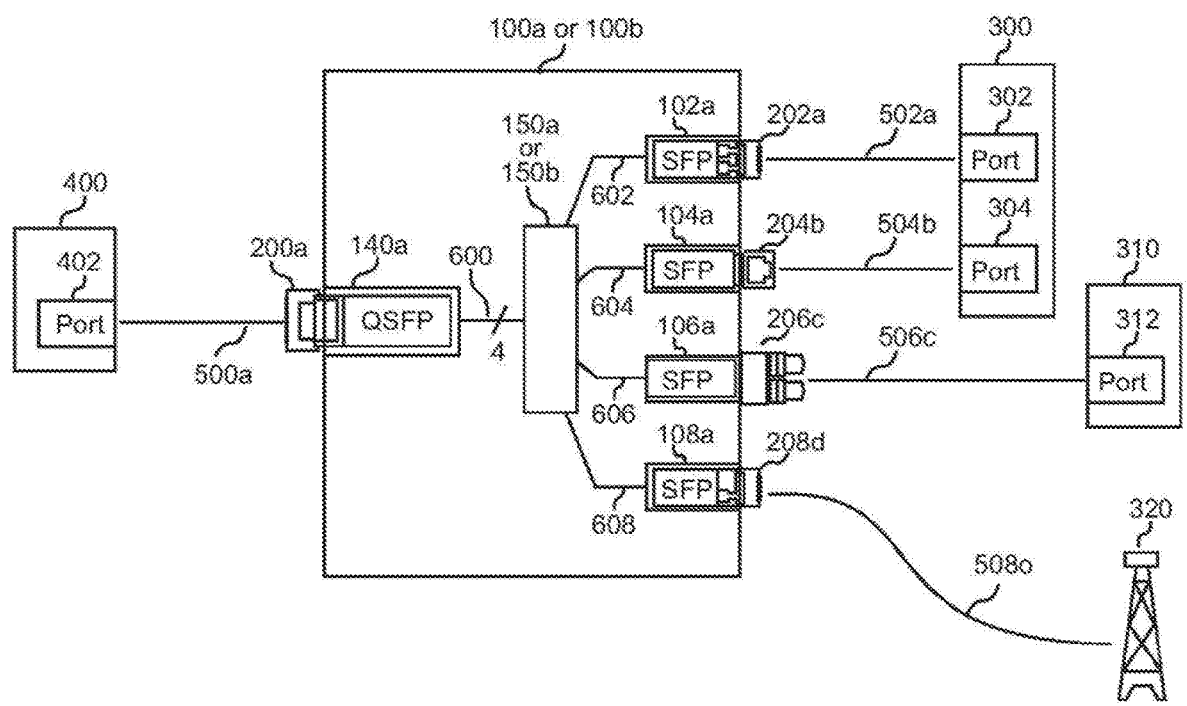
FIG. 6 is a block diagram illustrating methods, systems, devices, circuitry and equipment of the present disclosure having the ability to provide different physical media interfaces, cabling, and media conversion on any SFP and QSFP devices.

FIG. 6 illustrates a diagram of an embodiment of the communications system and equipment of the present disclosure, wherein a Device 100a or 100b interfaces four communication services, two communication services from Communication Equipment 300, one communication service from Communication Equipment 310, and one communication service from Communication Tower 320. The Device 100a or 100b then aggregates the four communication services for transmission to Communication Equipment 400 by way of a single QSFP Device 200a. This embodiment allows the use of different cabling types, cable lengths, and the ability to change and replace any cable or SFP and QSFP type devices. This embodiment allows media conversion on the SFP and QSFP devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power SFP, SFP+, SFP28, SFP56, QSFP, QSFP+, and QSFP28 devices.

As illustrated in FIG. 6, the Network is comprised of a Device 100a or 100b having five Ports 102a, 104a, 106a, 108a, and 140a, Communication Equipment 300 having two Ports 302, 304, Communication Equipment 310 having one Port 312, Communication Tower 320 and Communication Equipment 400 having one Port 402. The Device 100a or 100b has a SFP Device 202a connected to Port 102a, a SFP Device 204b connected to Port 104a, a SFP Device 206c connected to Port 106a, a SFP Device 208d connected to Port 108a, and a QSFP Device 200a connected to Port 140a. The Device 100a or 100b has Paths 602, 604, 606, and 608 which define transmit and receive differential signal paths between the SFP Ports 102a, 104a, 106a, and 108a and Circuitry 150a or 150b of the Device. Path 600 defines four transmit and receive differential signal paths between the QSFP Port 140a and Circuitry 150a and 150b of the Device. Device 100a has Circuitry 150a whereas Device 100b has Circuitry 150b. The Circuitry 150a or 150b is comprised of input and output differential amplifiers and retimers through differential signal paths. The Circuitry 150b of Device 100b has a cross-connect switch which provides non-blocking cross-connects between all Paths. Further details on Circuitry 150a and 150b are illustrated in FIGS. 16 and 17, respectively.

A standard indoor fiber Cable 502a is used to interface the communication services between Communication Equipment 300 and Device 100a or 100b, specifically connecting the indoor fiber Cable 502a from SFP Device 202a in Port 102a of Device 100a or 100b to Port 302 of the Communication Equipment 300. An Ethernet RJ45 connectorized wired Cable 504b is used to interface the communication services between the Communication Equipment 300 and Device 100a or 100b, specifically connecting the wired Cable 504b from a RJ45 SFP Device 204b in Port 104a to Port 304 of the Communication Equipment 300. A coax Cable 506c is used to interface the communication service between Communication Equipment 310 and Device 100a or 100b, specifically connecting the coax Cable 506c from a Coax SFP Device 206c in Port 106a of Device 100a or 100b to Port 312 of Communication Equipment 310. An outside armored single fiber Cable 508o is used to interface the communication services between the Communication Tower 320 and Device 100a or 100b, specifically connecting the outdoor fiber Cable 508o from a Wave Division Multiplexing (WDM) SFP Device 208d in Port 108a of Device 100a or 100b to the Communication Tower 320. A fiber Cable 500a is used to interface the four communication services between the Communication Equipment 400 and Device 100a or 100b, specifically connecting the fiber Cable 500a from QSFP Device 200a in Port 140a of Device 100a or 100b to Port 402 of the Communication Equipment 400.

The SFP and QSFP Devices in this embodiment can be alternatively replaced by various other SUP Devices and their derivative. SUP Devices presently are defined for SFP, SFP+, SFP28, SFP56, QSFP, QSFP+, QSPF28, QSFP-DD and OSPF technologies. These other SFP Devices provide different media interfaces and connection types, e.g., wire cable, optical cable, coax cable, and wireless.

Figure 7:
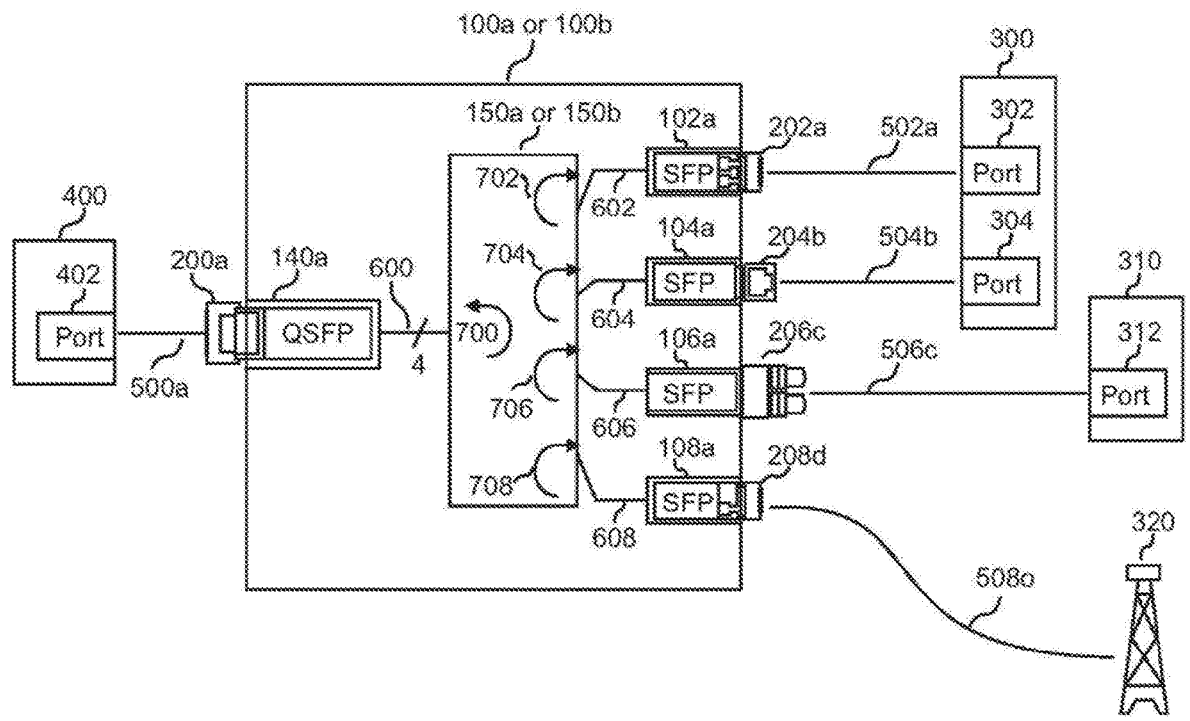
FIG. 7 is a block diagram illustrating methods, systems, devices, circuitry and equipment of the present disclosure having the ability to provide loopback testing.

FIG. 7 illustrates a diagram of an embodiment of the communications system and equipment of the present disclosure, wherein a Device 100a or 100b interfaces four communication services, two communication services from Communication Equipment 300, one communication service from Communication Equipment 310, and one communication service from Communication Tower 320. The Device 100a or 100b then aggregates the four communication services for transmission to Communication Equipment 400 by way of a single QSFP Device 200a. This embodiment also illustrates the Device performing loopback for testing the SFP and QSFP devices and associated communication services, which Communication Equipment 300 and 400 will be able to evaluate and diagnosis the communication services. This embodiment also allows the use of different cabling types, cable lengths, and the ability to change and replace any cable or SFP and QSFP type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power SFP, SFP+, SFP28, SFP56, QSFP, QSFP+, and QSFP28 devices.

As illustrated in FIG. 7, the Network is comprised of a Device 100a or 100b having five Ports 102a, 104a, 106a, 108a, and 140a, Communication Equipment 300 having two Ports 302, 304, Communication Equipment 310 having one Port 312, Communication Tower 320 and Communication Equipment 400 having one Port 402. The Device 100a or 100b has a SFP Device 202a connected to Port 102a, a SFP Device 204b connected to Port 104a, a SFP Device 206c connected to Port 106a, a SFP Device 208d connected to Port 108a, and a QSFP Device 200a connected to Port 140a. The Device 100a or 100b has Paths 602, 604, 606, and 608 which define transmit and receive differential signal paths between the SFP Ports 102a, 104a, 106a, and 108a and Circuitry 150a or 150b of the Device. Path 600 defines four transmit and receive differential signal paths between the QSFP Port 140a and Circuitry 150a and 150b of the Device. Device 100a has Circuitry 150a whereas Device 100b has Circuitry 150b. The Circuitry 150a or 150b is comprised of input and output differential amplifiers and retimers through differential signal paths. The Circuitry 150b of Device 100b has a cross-connect switch which provides non-blocking cross-connects between all Paths. The Device 100a or 100b can perform loopback testing in Circuitry 150a or 150b. Loopback circuitry 700 is looping back any and all differential signaling paths of Path 600, Loopback circuitry 702 is looping back Path 602, Loopback circuitry 704 is looping back Path 604, Loopback circuitry 706 is looping back Path 606, and Loopback circuitry 708 is looping back Path 608. Further details on Circuitry 150a and 150b are illustrated in FIGS. 16 and 17, respectively.

A standard indoor fiber Cable 502a is used to interface the communication services between Communication Equipment 300 and Device 100a or 100b, specifically connecting the indoor fiber Cable 502a from SFP Device 202a in Port 102a of Device 100a or 100b to Port 302 of the Communication Equipment 300. An Ethernet RJ45 connectorized wired Cable 504b is used to interface the communication services between the Communication Equipment 300 and Device 100a or 100b, specifically connecting the wired Cable 504b from a RJ45 SFP Device 204b in Port 104a to Port 304 of the Communication Equipment 300. A coax Cable 506c is used to interface the communication service between Communication Equipment 310 and Device 100a or 100b, specifically connecting the coax Cable 506c from a Coax SFP Device 206c in Port 106a of Device 100a or 100b to Port 312 of Communication Equipment 310. An outdoor fiber Cable 508o is used to interface the communication services between the Communication Tower 320 and Device 100a or 100b, specifically connecting the outdoor single fiber Cable 508o from a Wave Division Multiplexing (WDM) SFP Device 208d in Port 108a of Device 100a or 100b to the Communication Tower 320. A fiber Cable 500a is used to interface the four communication services between the Communication Equipment 400 and Device 100a or 100b, specifically connecting the fiber Cable 500a from QSFP Device 200a in Port 140a of Device 100a or 100b to Port 402 of the Communication Equipment 400.

The SFP and QSFP Devices in this embodiment can be alternatively replaced by various other SFP Devices and their derivative. SFP Devices presently are defined for SFP, SFP+, SFP28, SFP56, QSFP, QSFP+, QSPF28, QSFP-DD and OSPF technologies.

Figure 8:
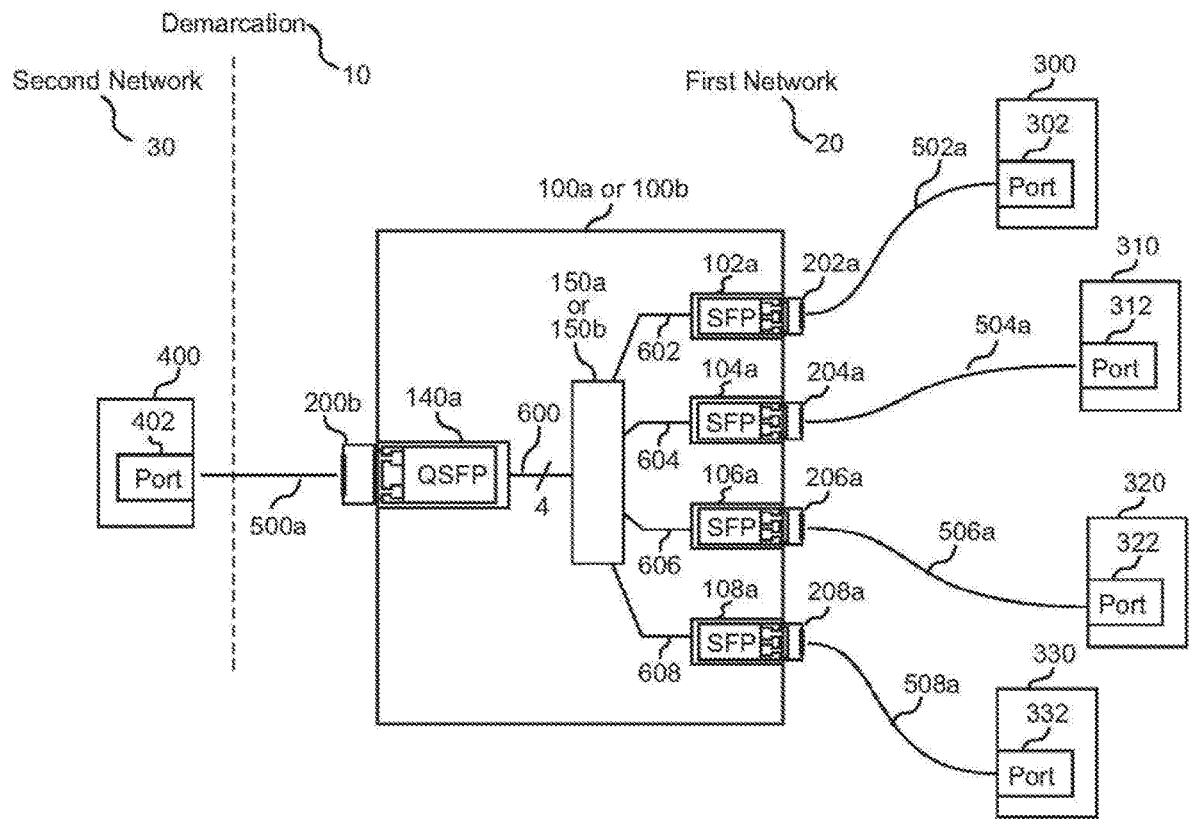
FIG. 8 is a block diagram illustrating methods, systems, devices, circuitry and equipment of the present disclosure establishing a Demarcation Point with a QSFP+ device.

FIG. 8 illustrates a diagram of another embodiment of the communications system and equipment of the present disclosure, wherein the Device 100a or 100b of the present disclosure establishes a Demarcation Point 10 between a First Network 20 and a Second Network 30, specifically through QSFP Device 200b in Port 140a, in communication with a Port 402 on the Communication Equipment 400 of the Second Network 30. The Device 100a or 100b provides a cost effective and efficient method and system of providing a Demarcation Point on four communication services by way of a single WDM QSFP Device 200b. This embodiment also allows the use of different cabling types, cable lengths, and the ability to change and replace any cable or SFP and QSFP type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power SFP, SFP+, SFP28, SFP56, QSFP, QSFP+, and QSFP28 devices.

As illustrated in FIG. 8, the First Network 20 is comprised of a Device 100a or 100b having five Ports 102a, 104a, 106a, 108a, and 140a, Communication Equipment 300 having Port 302, Communication Equipment 310 having Port 312, Communication Equipment 320 having Port 322, and Communication Equipment 330 having a Port 332. The Device 100a or 100b has a SFP Device 202a connected to Port 102a, a SFP Device 204a connected to Port 104a, a SFP Device 206a connected to Port 106a, a SFP Device 208a connected to Port 108a, and a Wave Division Multiplexing (WDM) QSFP Device 200b connected to Port 140a. The Device 100a and 100b have Paths 602, 604, 606, and 608 which define transmit and receive differential signal paths between the SFP Ports 102a, 104a, 106a, and 108a and Circuitry 150a or 150b of the Device. Path 600 defines four transmit and receive differential signal paths between the WDM QSFP Port 140a of the Device and Circuitry 150a and 150b. The Circuitry 150a or 150b is comprised of input and output differential amplifiers and retimers through differential signal paths. Device 100a has Circuitry 150a whereas Device 100b has Circuitry 150b. The Circuitry 150b of Device 100b has a cross-connect switch which provides non-blocking cross-connects between all Paths. Further details on Circuitry 150a and 150b are illustrated in FIGS. 16 and 17, respectively. The Second Network 30 includes Communication Equipment 400 having Port 402.

In this embodiment, the First Network 20 establishes a Demarcation Point 10 with Device 100a or 100b through QSFP Device 200b. A fiber Cable 500a is used to interface the four communication services between the Communication Equipment 400 and Device 100a or 100b, specifically connecting the fiber Cable 500a from WDM QSFP Device 200b in Port 140a of Device 100a or 100b to Port 402 of the Communication Equipment 400 of the Second Network 30. The Device 100a or 100b in turn connects to the Communication Equipment 300 of the First Network 20 through a fiber Cable 502a, specifically connecting SFP Device 202a to Port 302 of the Communication Equipment 300, a fiber Cable 504a, specifically connecting SFP Device 204a to Port 312 of the Communication Equipment 310, a fiber Cable 506a, specifically connecting SFP Device 206a to Port 322 of the Communication Equipment 320, and a fiber Cable 508a, specifically connecting SFP Device 208a to Port 332 of the Communication Equipment 330 of the First Network 20. The SFP and QSFP Devices in this embodiment can be alternatively replaced by various other SFP Devices and their derivative. SFP Devices presently are defined for SFP, SFP+, SFP28, SFP56, QSFP, QSFP+, QSPF28, QSFP-DD and OSPF technologies. These other SFP Devices provide different media interfaces and connection types, e.g., wire cable, optical cable, coax cable, and wireless.

Figure 9:
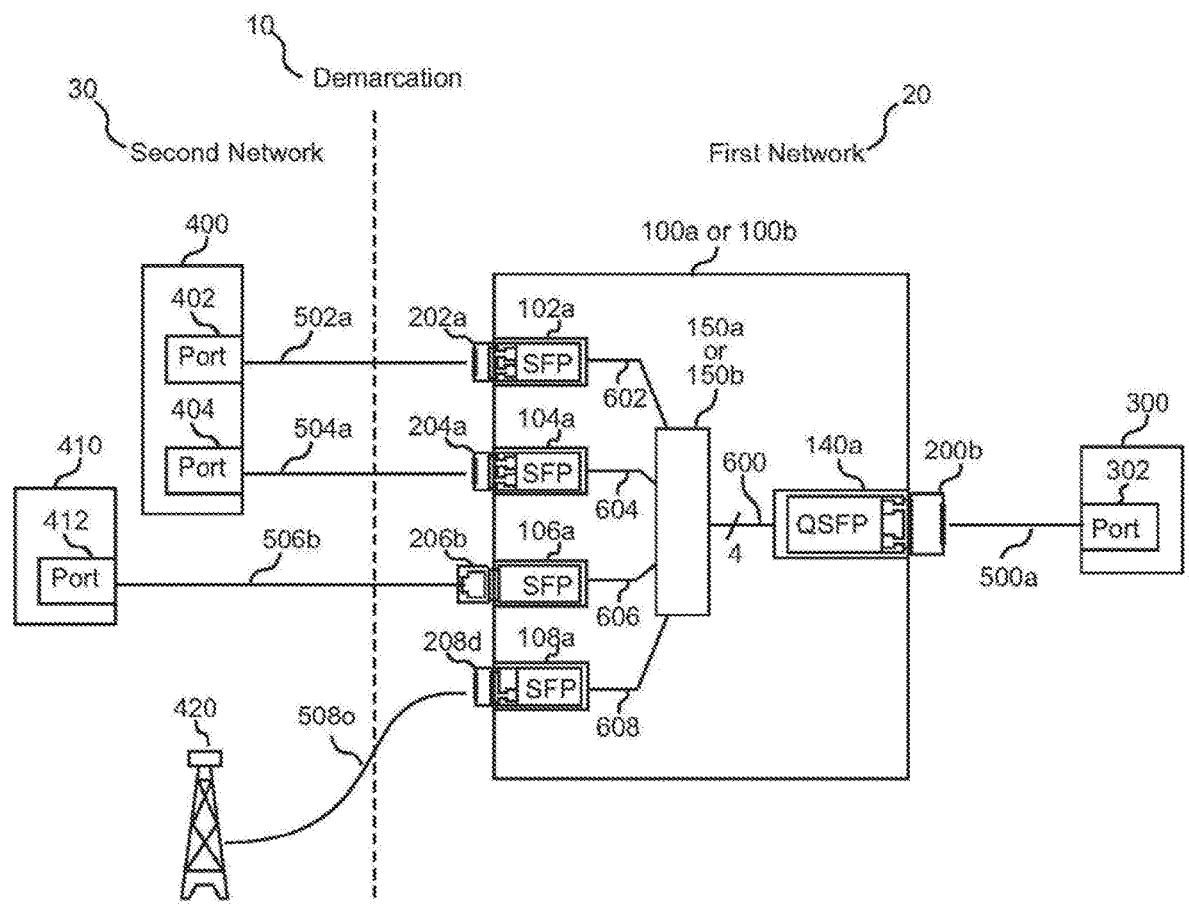
FIG. 9 is a block diagram illustrating methods, systems, devices, circuitry and equipment of the present disclosure establishing a Demarcation Point with four SFP+ devices.

FIG. 9 illustrates a diagram of another embodiment of the communications system and equipment of the present disclosure, wherein the Device 100a or 100b of the present disclosure establishes a Demarcation Point 10 between a First Network 20 and a Second Network 30, specifically through SFP Device 202a and 204a in communication with a Port 402 and 404 respectively on the Communication Equipment 400 of the Second Network 30, through SFP Device 206b in communication with Port 412 on the Communication Equipment 410 of the Second Network 30, and through SFP Device 208d in communication with the Communication Tower 420 of the Second Network 30. The Device 100a or 100b provides a cost effective and efficient method and system for a communication service Demarcation Point by allowing the First Network to provide four communication services. This embodiment allows the use of different cabling types, cable lengths, and the ability to change and replace any cable or SFP and QSFP type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power SFP, SFP+, SFP28, SFP56, QSFP, QSFP+, and QSFP28 devices.

As illustrated in FIG. 9, the First Network 20 is comprised of a Device 100a or 100b having five Ports 102a, 104a, 106a, 108a, and 140a, and Communication Equipment 300 having a Port 302. The Device 100a or 100b has a SFP Device 202a connected to Port 102a, a SFP Device 204a connected to Port 104a, a SFP Device 206b connected to Port 106a, a SFP Device 208d connected to Port 108a, and a QSFP Device 200b connected to Port 140a. The Device 100a or 100b has Paths 602, 604, 606, and 608 which define transmit and receive differential signal paths between the SFP Ports 102a, 104a, 106a, and 108a and Circuitry 150a or 150b of the Device. Path 600 defines four transmit and receive differential signal paths between the QSFP Port 140a and Circuitry 150a or 150b of the Device. The Circuitry 150a or 150b is comprised of input and output differential amplifiers and retimers through differential signal paths. Device 100a has Circuitry 150a whereas Device 100b has Circuitry 150b. The Circuitry 150b of Device 100b has a cross-connect switch which provides non-blocking cross-connects between all Paths. Further details on Circuitry 150a and 150b are illustrated in FIGS. 16 and 17, respectively. The Second Network 30 includes Communication Equipment 400 having Ports 402 and 404, Communication Equipment 410 having Port 412, and Communication Tower 420.

In this embodiment, the First Network 20 establishes a Demarcation Point 10 with Device 100a or 100b through SFP Device 202a, 204a, 206b, and 208a. A fiber Cable 502a is used to interface the communication services between the Communication Equipment 400 and Device 100a or 100b, specifically connecting the fiber Cable 502a from SFP Device 202a in Port 102a of Device 100a or 100b to Port 402 of the Communication Equipment 400 of the Second Network 30. A fiber Cable 504a is used to interface the communication services between the Communication Equipment 400 and Device 100a or 100b, specifically connecting the fiber Cable 504a from SFP Device 204a in Port 104a of Device 100a or 100b to Port 404 of the Communication Equipment 400 of the Second Network 30. A wire Cable 506b is used to interface communication services between Communication Equipment 410 and Device 100a or 100b, specifically connecting the wire Cable 506b from SFP Device 206b in Port 106a of Device 100a or 100b to Port 412 of the Communication Equipment 410 of the Second Network 30. An outdoor fiber Cable 508o is used to interface communication services between Communication Tower 420 and Device 100a or 100b, specifically connecting the outdoor fiber Cable 508o from SFP Device 208d in Port 108a of Device 100a or 100b to the Communication Tower 420 of the Second Network 30. The Device 100a or 100b in turn connects to the Communication Equipment 300 of the First Network 20 through a fiber Cable 500a, specifically connecting the wave division multiplexing (WDM) SFP Device 200b in Port 140a of Device 100a or 100b to the Port 302 of the Communication Equipment 300 of the First Network 20. The SFP and QSFP Devices in this embodiment can be alternatively replaced by various other SFP Devices and their derivative. SFP Devices presently are defined for SFP, SFP+, SFP28, SFP56, QSFP, QSFP+, QSPF28, QSFP-DD and OSPF technologies. These other SFP Devices provide different media interfaces and connection types, e.g., wire cable, optical cable, coax cable, and wireless.

Figure 10:
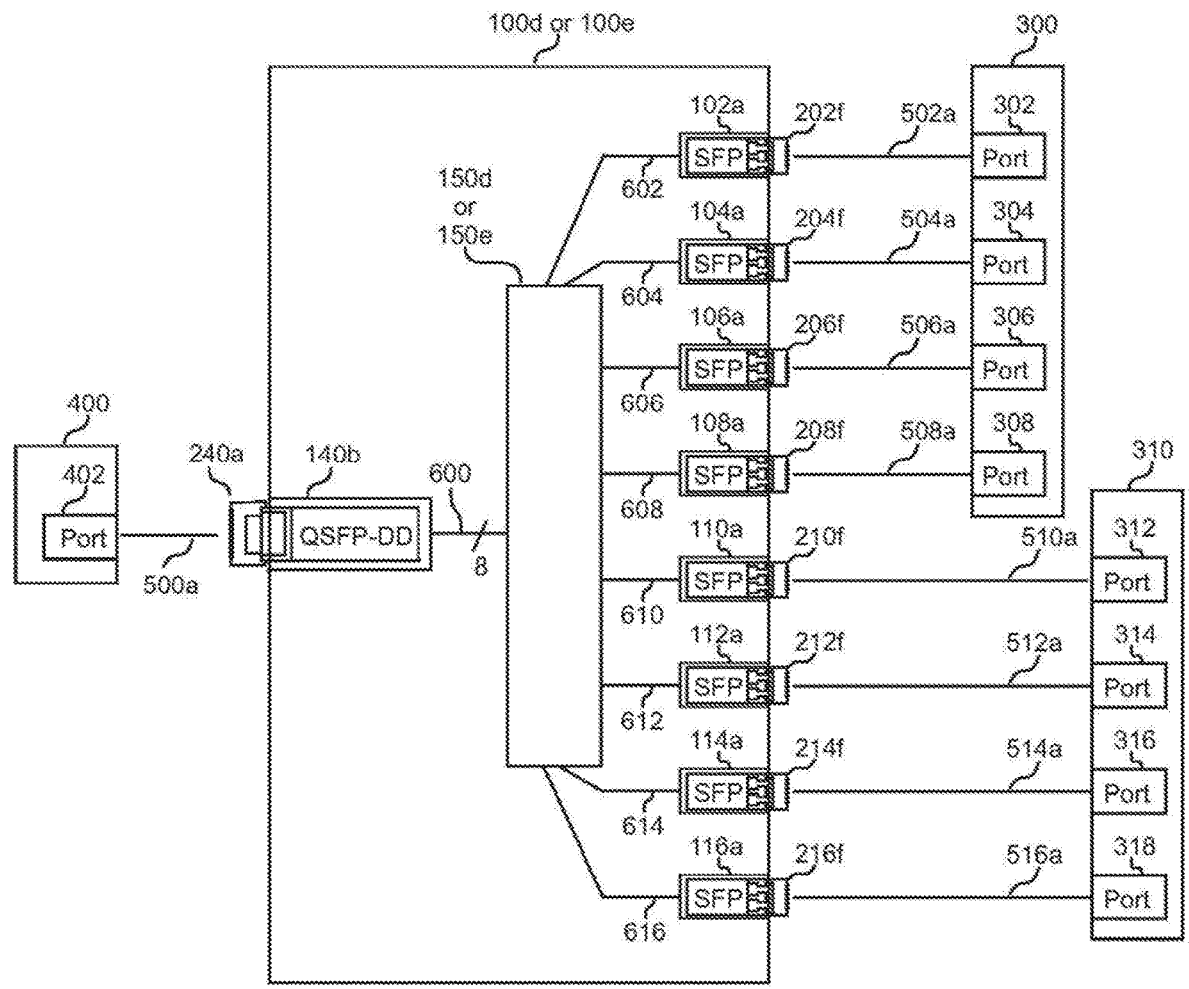
FIG. 10 is a block diagram illustrating methods, systems, devices, circuitry and equipment of the present disclosure used to aggregate communication services between a communication equipment device having a QSFP-DD port and two communication equipment, utilizing a total of eight SFP28 ports.

FIG. 10 illustrates a diagram of an embodiment of the communications system and equipment of the present disclosure, wherein a Device 100d (if with circuitry 150d) or 100e (if with circuitry 150e) interfaces eight communication services, four communication services from Communication Equipment 300 and four communication service from Communication Equipment 310, and aggregates the eight communication services for transmission to Communication Equipment 400 by way of a QSFP-DD Device 240a. This embodiment allows the use of different cabling types, cable lengths, and the ability to change and replace any cable or SFP and QSFP type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power SFP+, SFP28, SFP56, QSFP, QSFP+, QSFP28, QSFP-DD, and OSFP devices.

Figure 18:
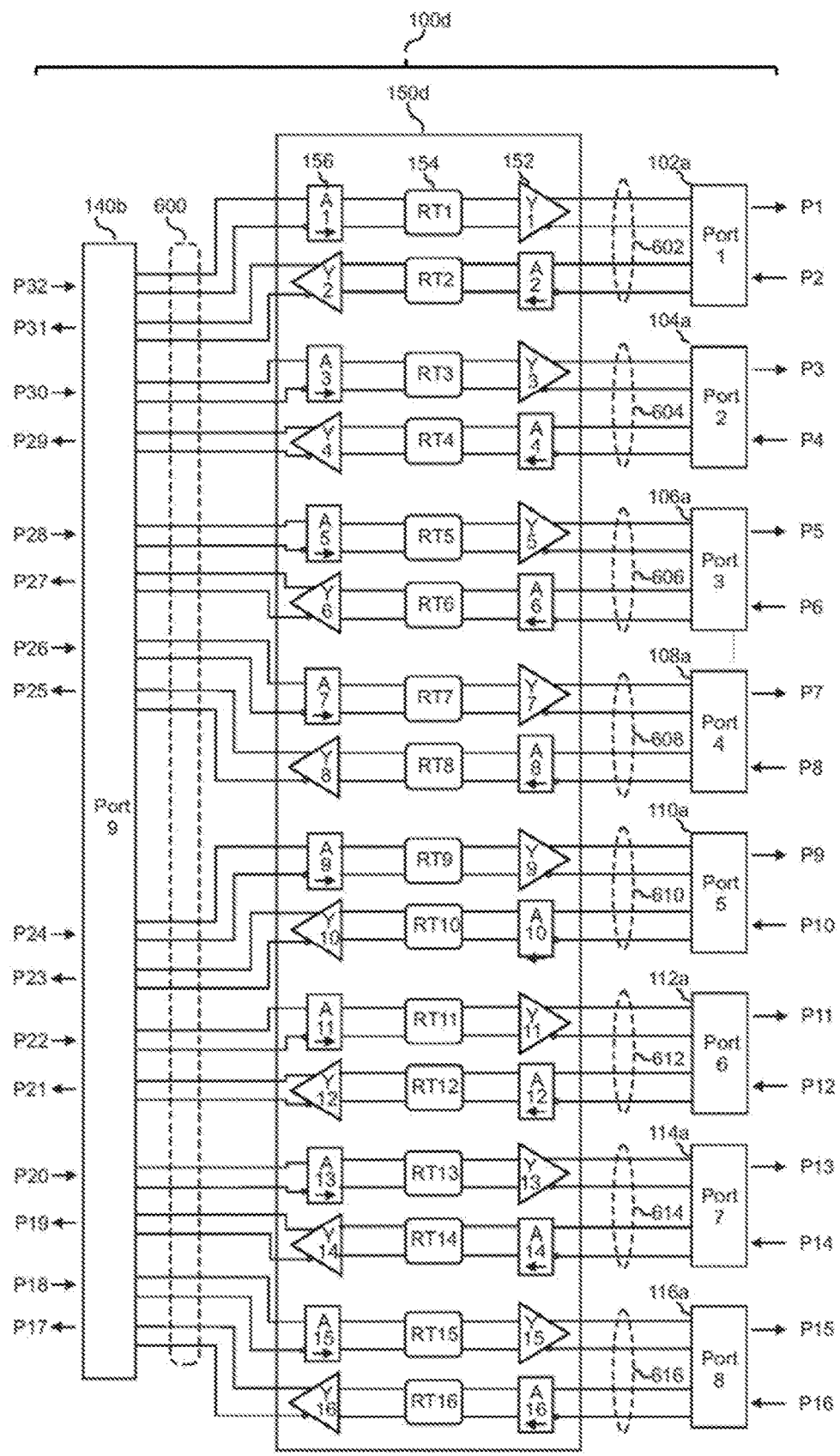
FIG. 18 is a schematic diagram illustrating methods, systems, devices, circuitry and equipment of the present disclosure having circuitry used to amplify, equalize, and retime differential signal paths between a QSFP-DD device and eight SFP28 devices.
Figure 19:
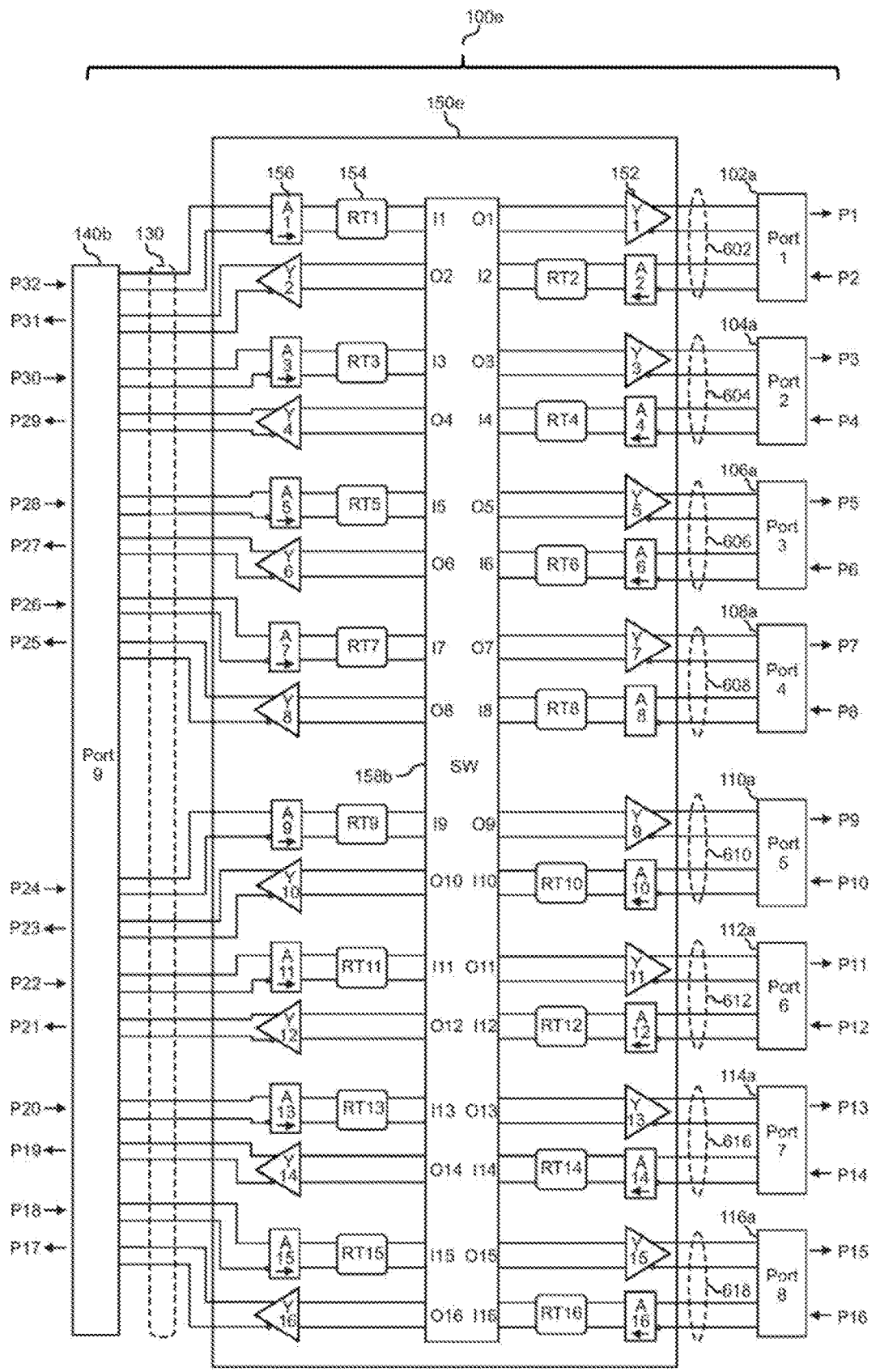
FIG. 19 is a schematic diagram illustrating methods, systems, devices, circuitry and equipment of the present disclosure having circuitry used to amplify, equalize, retime, and switch differential signal paths between a QSFP-DD device and eight SFP28 devices.

As illustrated in FIG. 10, the Network is comprised of a Device 100d or 100e having nine Ports 102a, 104a, 106a, 108a, 110a, 112a, 114a, 116a, and 140b, Communication Equipment 300 having four Ports 302, 304, 306, and 308, Communication Equipment 310 having four Ports 312, 314, 316, and 318, and Communication Equipment 400 having one Port 402. Cables 500a, 502a, 504a, 506a, 508a, 510a, 512a, 514a, and 516a can individually vary in length, type, and material for the given application. The individual cables can also be replaced for repair or application changes. The Device 100d or 100e has a SFP28 Device 202f connected to Port 102a, a SFP28 Device 204f connected to Port 104a, a SFP28 Device 206f connected to Port 106a, a SFP28 Device 208f connected to Port 108a, a SFP28 Device 210f connected to Port 110a, a SFP28 Device 212f connected to Port 112a, a SFP28 Device 214f connected to Port 114a, a SFP28 Device 216f connected to Port 116a, and a QSFP-DD Device 240a connected to Port 140b. The Device 100d or 100e has Paths 602, 604, 606, 608, 610, 612, 614, and 616 which define transmit and receive differential signal paths between the SFP Ports 102a, 104a, 106a, 108a, 110a, 112a, 114a, and 116a and Circuitry 150d or 150e of the Device. Path 600 defines eight transmit and receive differential signal paths between the QSFP-DD Port 140b and Circuitry 150d and 150e of the Device. The Circuitry 150d or 150e is comprised of input and output differential amplifiers and retimers through differential signal paths, as shown and discussed in more detail with respect to FIGS. 18 and 19 respectively. Device 100d has Circuitry 150d whereas Device 100e has Circuitry 150e. The Circuitry 150e of Device 100e has a cross-connect switch which provides non-blocking cross-connects between all Paths. Further details on Circuitry 150d and 150e are illustrated in FIGS. 18 and 19, respectively.

Four fiber Cables 502a, 504a, 506a, and 508a are used to interface the four communication services between Communication Equipment 300 and Device 100d or 100e, specifically connecting a fiber Cable 502a from SFP Device 202f in Port 102a on Device 100d or 100e to Port 302, a fiber Cable 504a from SFP Device 204f in Port 104a of Device 100d or 100e to Port 304, a fiber Cable 506a from SFP Device 206f in Port 106a of Device 100d or 100e to Port 306, and a fiber Cable 508a from SFP Device 208f in Port 108a of Device 100d or 100e to Port 308. Another four fiber Cables 510a, 512a, 514a, and 516a are used to interface the four communication service between Communication Equipment 310 and Device 100d or 100e, specifically connecting a fiber Cable 510a from SFP Device 210f in Port 110a of Device 100d or 100e to Port 312, a fiber Cable 512a from SFP Device 212f in Port 112a of Device 100d or 100e to Port 314, a fiber Cable 514a from SFP Device 214f in Port 114a of Device 100d or 100e to Port 316, and a fiber Cable 516a from SFP Device 216f in Port 116a of Device 100d or 100e to Port 318. The Device 100d or 100e in turn connects to the Communication Equipment 400 through a fiber Cable 500a, specifically connecting the QSFP-DD Device 240a in Port 140b of Device 100d or 100e to Port 402 of the Communication Equipment 400. The SFP28 and QSFP-DD Devices in this embodiment can be alternatively replaced by various other SFP Devices and their derivative. SFP Devices presently are defined for SFP, SFP+, SFP28, SFP56, QSFP, QSFP+, QSPF28, QSFP-DD and OSPF technologies. These other SFP Devices provide different media interfaces and connection types, e.g., wire cable, optical cable, coax cable, and wireless.

Figure 11:
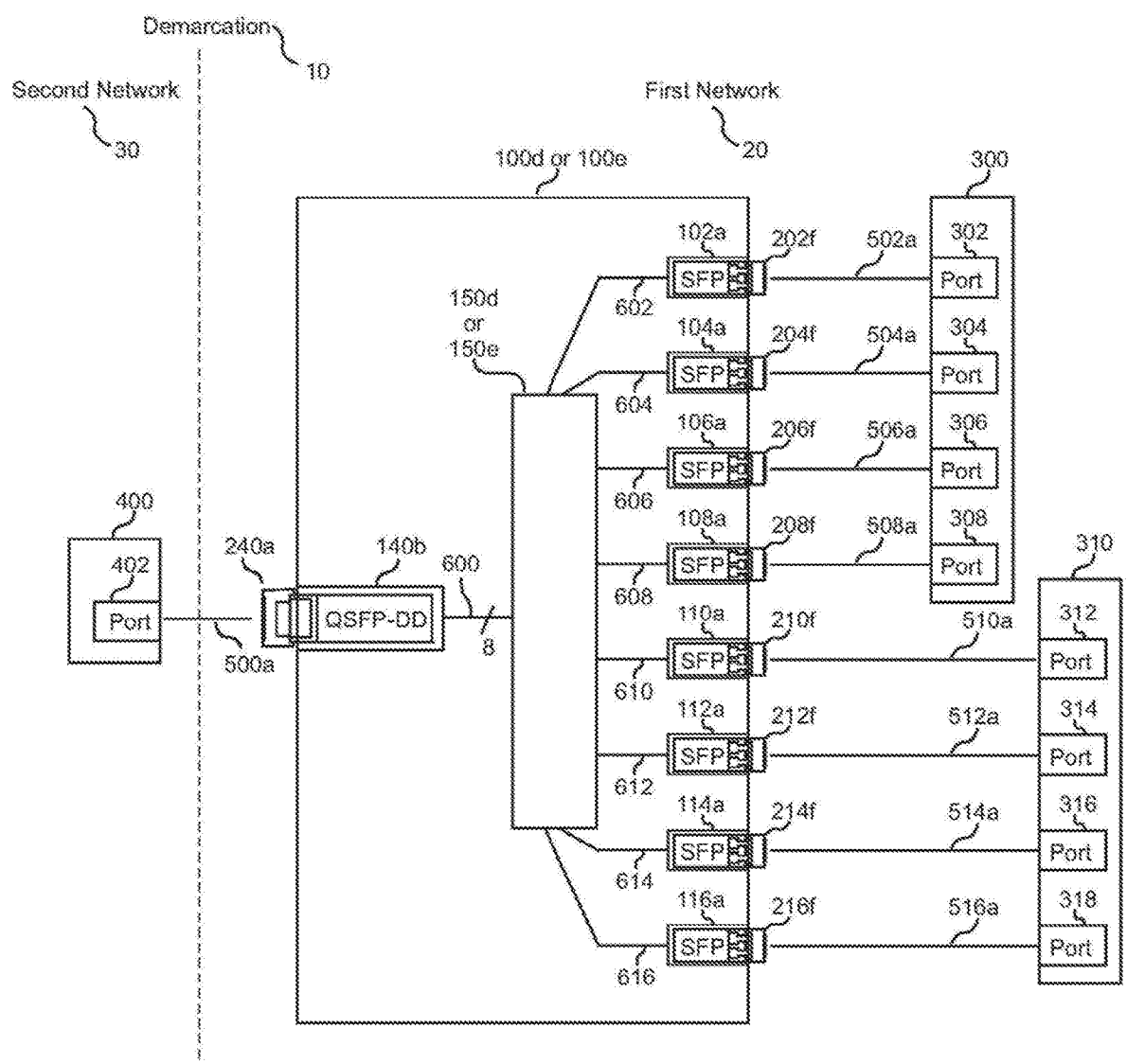
FIG. 11 is a block diagram illustrating methods, systems, devices, circuitry and equipment of the present disclosure establishing a Demarcation Point with a QSFP-DD device.

FIG. 11 illustrates a diagram of another embodiment of the communications system and equipment of the present disclosure, wherein the Device 100d or 100e of the present disclosure establishes a Demarcation Point 10 between a First Network 20 and a Second Network 30, specifically through QSFP-DD Device 240a in Port 140b, in communication with a Port 402 on the Communication Equipment 400 of the Second Network 30. The Device 100d or 100e provides a cost effective and efficient method and system of providing Demarcation Point on eight communication services by way of a single QSFP-DD Device 240a. This embodiment allows the use of different cabling types, cable lengths, and the ability to change and replace any cable or SFP and QSFP type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power SFP+, SFP28, SFP56, QSFP, QSFP+, QSFP28, QSFP-DD, and OSFP devices.

As illustrated in FIG. 11, the First Network 20 is comprised of a Device 100d or 100e having nine Ports 102a, 104a, 106a, 108a, 110a, 112a, 114a, 116a, and 140b, Communication Equipment 300 having four Ports 302, 304, 306, and 308, and Communication Equipment 310 having four Ports 312, 314, 316, and 318. The Second Network is comprised of Communication Equipment 400 having one Port 402. Cables 500a, 502a, 504a, 506a, 508a, 510a, 512a, 514a, and 516a can individually vary in length, type, and material for the given application. The individual cables can also be replaced for repair or application changes. The Device 100d or 100e has a SFP28 Device 202f connected to Port 102a, a SFP28 Device 204f connected to Port 104a, a SFP28 Device 206f connected to Port 106a, a SFP28 Device 208f connected to Port 108a, a SFP28 Device 210f connected to Port 110a, a SFP28 Device 212f connected to Port 112a, a SFP28 Device 214f connected to Port 114a, a SFP28 Device 216f connected to Port 116a, and a QSFP-DD Device 240a connected to Port 140b. The Device 100d or 100e has Paths 602, 604, 606, 608, 610, 612, 614, and 616 which define transmit and receive differential signal paths between the SFP Ports 102a, 104a, 106a, 108a, 110a, 112a, 114a, and 116a and Circuitry 150d or 150e. Path 600 defines eight transmit and receive differential signal paths between the QSFP-DD Port 140b and Circuitry 150d and 150e of the Device. The Circuitry 150d or 150e is comprised of input and output differential amplifiers and retimers through differential signal paths. Device 100d has Circuitry 150d whereas Device 100e has Circuitry 150e. The Circuitry 150e of Device 100e has a cross-connect switch which provides non-blocking cross-connects between all Paths. Further details on Circuitry 150d and 150e are illustrated in FIGS. 18 and 19, respectively. The Second Network 30 includes Communication Equipment 400 having Port 402.

in this embodiment, the First Network 20 establishes a Demarcation Point 10 with Device 100d or 100e through QSFP-DD Device 240a. A fiber Cable 500a is used to interface the eight communication services between the Communication Equipment 400 and Device 100d or 100e, specifically connecting the fiber Cable 500a from QSFP-DD Device 240a in Port 140b of Device 100d or 100e to Port 402 of the Communication Equipment 400 of the Second Network 30. The Device 100d or 100e in turn connects to the Communication Equipment 300 of the First Network 20 through four fiber Cables 502a, 504a, 506a, and 508a. Fiber Cable 502a connects SFP28 Device 202f to Port 302 of the Communication Equipment 300, a fiber Cable 504a connects SFP28 Device 204f to Port 304 of the Communication Equipment 300, a fiber Cable 506a connects SFP28 Device 206f to Port 306 of the Communication Equipment 300, and a fiber Cable 508a connects SFP Device 208f to Port 308 of the Communication Equipment 300 of the First Network 20. The Device 100d or 100e connects another four fiber Cables 510a, 512a, 514a, and 516a to the Communication Equipment 310 of the First Network 20. A fiber Cable 510a connects SFP28 Device 210f to Port 312 of the Communication Equipment 310, a fiber Cable 512a connects SFP28 Device 212f to Port 314 of the Communication Equipment 310, a fiber Cable 514a connects SFP28 Device 214f to Port 306 of the Communication Equipment 300, and a fiber Cable 516a connects SFP28 Device 216f to Port 318 of the Communication Equipment 310 of the First Network 20. The SFP28 and QSFP-DD Devices in this embodiment can be alternatively replaced by various other SFP Devices and their derivative. SFP Devices presently are defined for SFP, SFP+, SFP28, SFP56, QSFP, QSFP+, QSPF28, QSFP-DD and OSPF technologies. These other SFP Devices provide different media interfaces and connection types, e.g., wire cable, optical cable, coax cable, and wireless.

Figure 12:
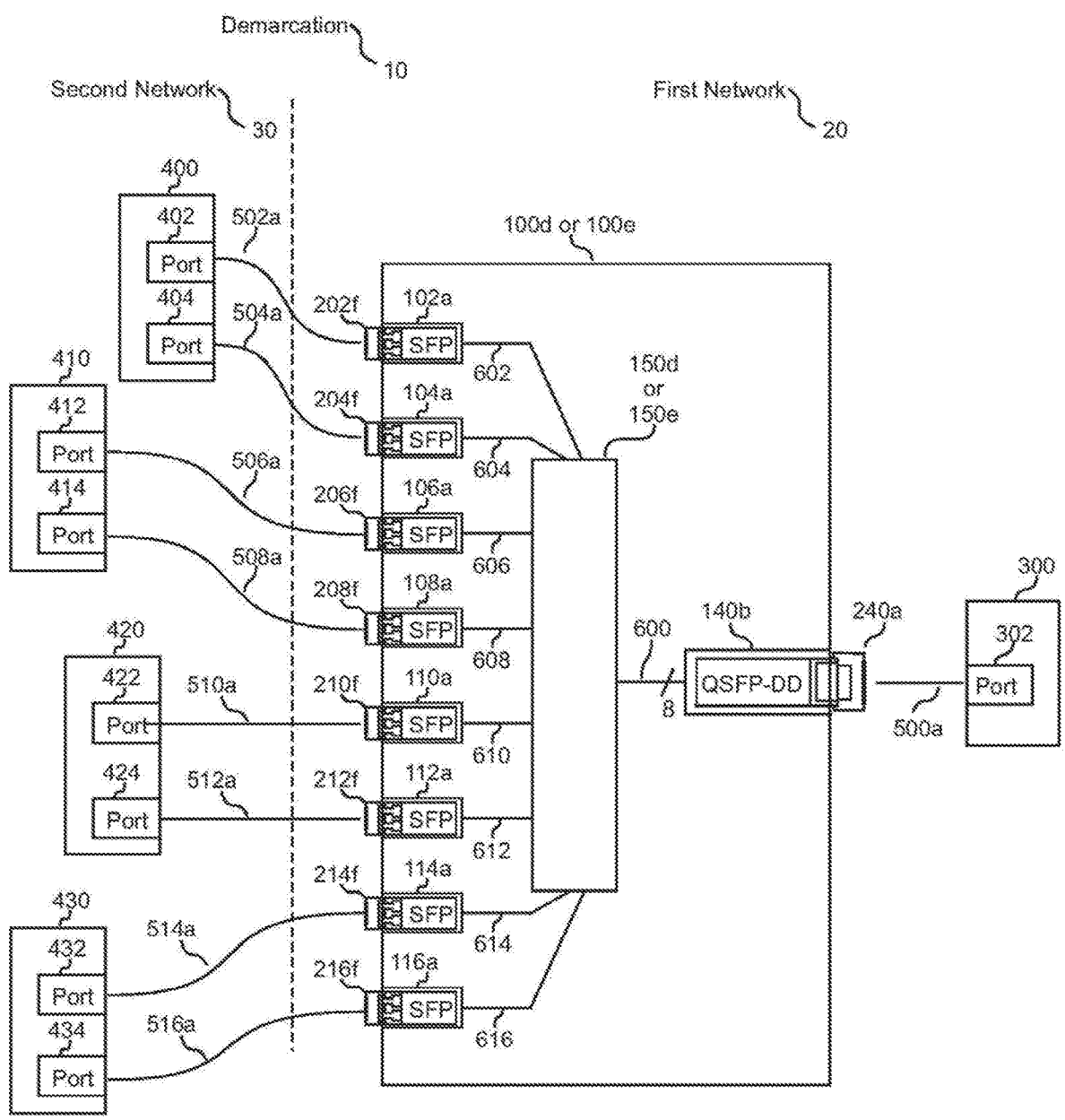
FIG. 12 is a block diagram illustrating methods, systems, devices, circuitry and equipment of the present disclosure establishing a Demarcation Point with eight SFP28 devices.

FIG. 12 illustrates a diagram of another embodiment of the communications system and equipment of the present disclosure, wherein the Device 100d or 100e of the present disclosure establishes a Demarcation Point 10 between a First Network 20 and a Second Network 30, specifically through SFP28 Device 202f, 204f, 206f, 208f, 210f, 212f, 214f, and 216f in communications with Port 402 and 404 on the Communication Equipment 400 of the Second Network, with Port 412 and 414, on the Communication Equipment 410 of the Second Network, with Port 422 and 424, on the Communication Equipment 420 of the Second Network, and with Port 432 and 434, on the Communication Equipment 430 of the Second Network, respectively. The Device 100d or 100e provides a cost effective and efficient method and system for a communication service Demarcation Point by allowing the First Network to provide eight communications services. This embodiment allows the use of different cabling types, cable lengths, and the ability to change and replace any cable or SFP and QSFP type devices. This embodiment allows the communication services to be aggregated from separate communication equipment and different equipment locations. This embodiment also extend communication services, provide a method to manage heat dissipation on communication equipment, and provide a method to manage power dissipation on communication equipment by using low-power SFP, QSFP, QSFP+, QSFP28, QSFP-DD, and OSFP devices to mitigate heat and power, and the ability to deploy extended communication services.

As illustrated in FIG. 12, the First Network 20 is comprised of a Device 100d or 100e having nine Ports 102a, 104a, 106a, 108a, 110a, 112a, 114a, 116a, and 140b, and Communication Equipment 300 having a Port 302. The Device 100d or 100e has a SFP28 Device 202f connected to Port 102a, a SFP28 Device 204f connected to Port 104a, a SFP28 Device 206f connected to Port 106a, a SFP28 Device 208f connected to Port 108a, a SFP28 Device 210f connected to Port 110a, a SFP28 Device 212f connected to Port 112a, a SFP28 Device 214f connected to Port 114a, a SFP28 Device 216f connected to Port 116a, and a QSFP-DD Device 240a connected to Port 140b. The Device 100d and 100e have Paths 602, 604, 606, 608, 610, 612, 614, and 616 which define transmit and receive differential signal paths between the SFP Ports 102a, 104a, 106a, 108a, 110a, 112a, 114a, and 116a and Circuitry 150d or 150e of the Device. Path 600 defines eight transmit and receive differential signal paths between the QSFP Port 140b of the Device and Circuitry 150d and 150e. The Circuitry 150d or 150e is comprised of input and output differential amplifiers and retimers through differential signal paths. Device 100d has Circuitry 150d whereas Device 100e has Circuitry 150e. The Circuitry 150e of Device 100e has a cross-connect switch which provides non-blocking cross-connects between all Paths. Further details on Circuitry 150d and 150e are illustrated in FIGS. 18 and 19, respectively. The Second Network 30 includes Communication Equipment 400 having Ports 402 and 404, Communication Equipment 410 having Ports 412 and 414, Communication Equipment 420 having Ports 422 and 424, and Communication Equipment 430 having Ports 432 and 434.

In this embodiment, the First Network 20 establishes a Demarcation Point 10 with Device 100d or 100e through SFP28 Device 202f, 204f, 206f, 208f, 210f, 212f, 214f, and 216f. Fiber Cables 502a and 504a are used to interface the communication services between the Communication Equipment 400 and Device 100d or 100e, specifically connecting the fiber Cable 502a from SFP28 Device 202f in Port 102a of Device 100d or 100e to Port 402 of the Communication Equipment 400 and connecting the fiber Cable 504a from SFP28 Device 204f in Port 104a of Device 100d or 100e to Port 404 of the Communication Equipment 400 of the Second Network 30. Fiber Cables 506a and 508a are used to interface the communication services between the Communication Equipment 410 and Device 100d or 100e, specifically connecting the fiber Cable 506a from SFP28 Device 206f in Port 106a of Device 100d or 100e to Port 412 of the Communication Equipment 410 and connecting the fiber Cable 508a from SFP28 Device 208f in Port 108a of Device 100d or 100e to Port 414 of the Communication Equipment 410 of the Second Network 30. Fiber Cables 510a and 512a are used to interface the communication services between the Communication Equipment 420 and Device 100d or 100e, specifically connecting the fiber Cable 510a from SFP28 Device 210f in Port 110a of Device 100d or 100e to Port 422 of the Communication Equipment 420 and connecting the fiber Cable 512a from SFP28 Device 212f in Port 112a of Device 100d or 100e to Port 424 of the Communication Equipment 420 of the Second Network 30. Fiber Cables 514a and 516a are used to interface the communication services between the Communication Equipment 430 and Device 100d or 100e, specifically connecting the fiber Cable 514a from SFP28 Device 214f in Port 114a of Device 100d or 100e to Port 432 of the Communication Equipment 430 and connecting the fiber Cable 516a from SFP28 Device 216f in Port 116a of Device 100d or 100e to Port 434 of the Communication Equipment 430 of the Second Network 30. The Device 100d or 100e in turn connects to the Communication Equipment 300 of the First Network 20 through a fiber Cable 500a, specifically connecting the QSFP-DD Device 240a in Port 140b of Device 100d or 100e to the Port 302 of the Communication Equipment 300 of the First Network 20.

The SFP28 and QSFP-DD Devices in this embodiment can be alternatively replaced by various other SFP Devices and their derivative. SFP Devices presently are defined for SFP, SFP+, SFP28, SFP56, QSFP, QSFP+, QSPF28, QSFP-DD and OSPF technologies. These other SFP Devices provide different media interfaces and connection types, e.g., wire cable, optical cable, coax cable, and wireless.

Figure 13:
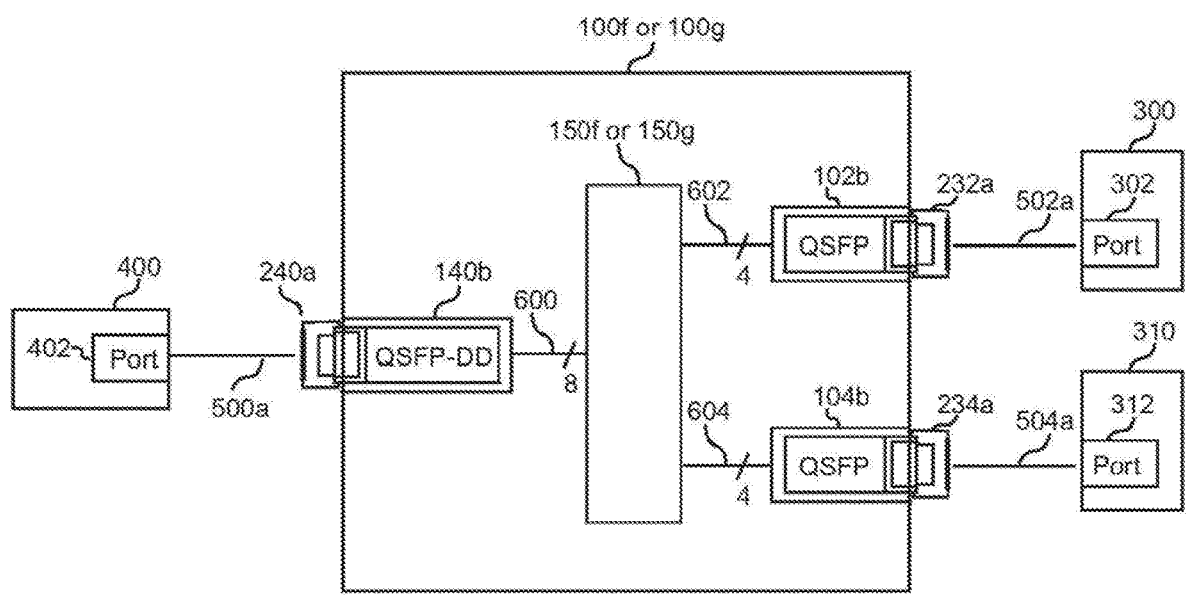
FIG. 13 is a block diagram illustrating methods, systems, devices, circuitry and equipment of the present disclosure used to aggregate communication services between a communication equipment device having a QSFP-DD port and two communication equipment with QSFP28 ports.

FIG. 13 illustrates a diagram of an embodiment of the communications system and equipment of the present disclosure, wherein a Device 100*f* (if with circuitry 150*f*) or 100*g* (if with circuitry 150*g*) interfaces eight communication services, four communication services from Communication Equipment 300 and four communication services from Communication Equipment 310. The Device 100*f* or 100*g* then aggregates the eight communication services for transmission to Communication Equipment 400 by way of a single QSFP-DD Device 240*a*. This embodiment allows the use of different cabling types, cable lengths, and the ability to change and replace any cable or QSFP-DD, OSFP and QSFP type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power QSFP, QSFP-DD, and OSFP devices.

Figure 20:
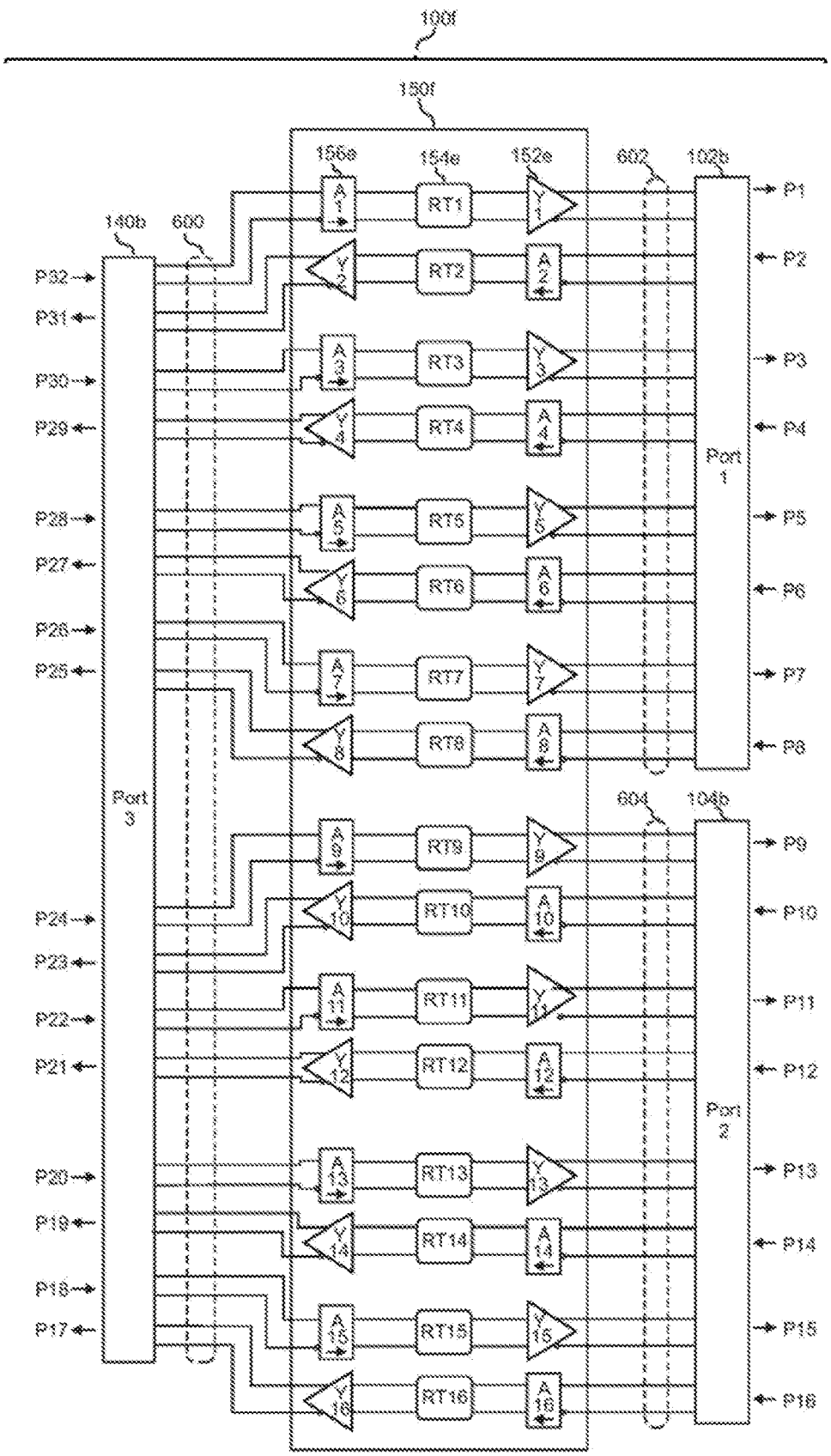
FIG. 20 is a schematic diagram illustrating methods, systems, devices, circuitry and equipment of the present disclosure having circuitry used to amplify, equalize, and retime differential signal paths between a QSFP-DD device and two QSFP28 devices.
Figure 21:
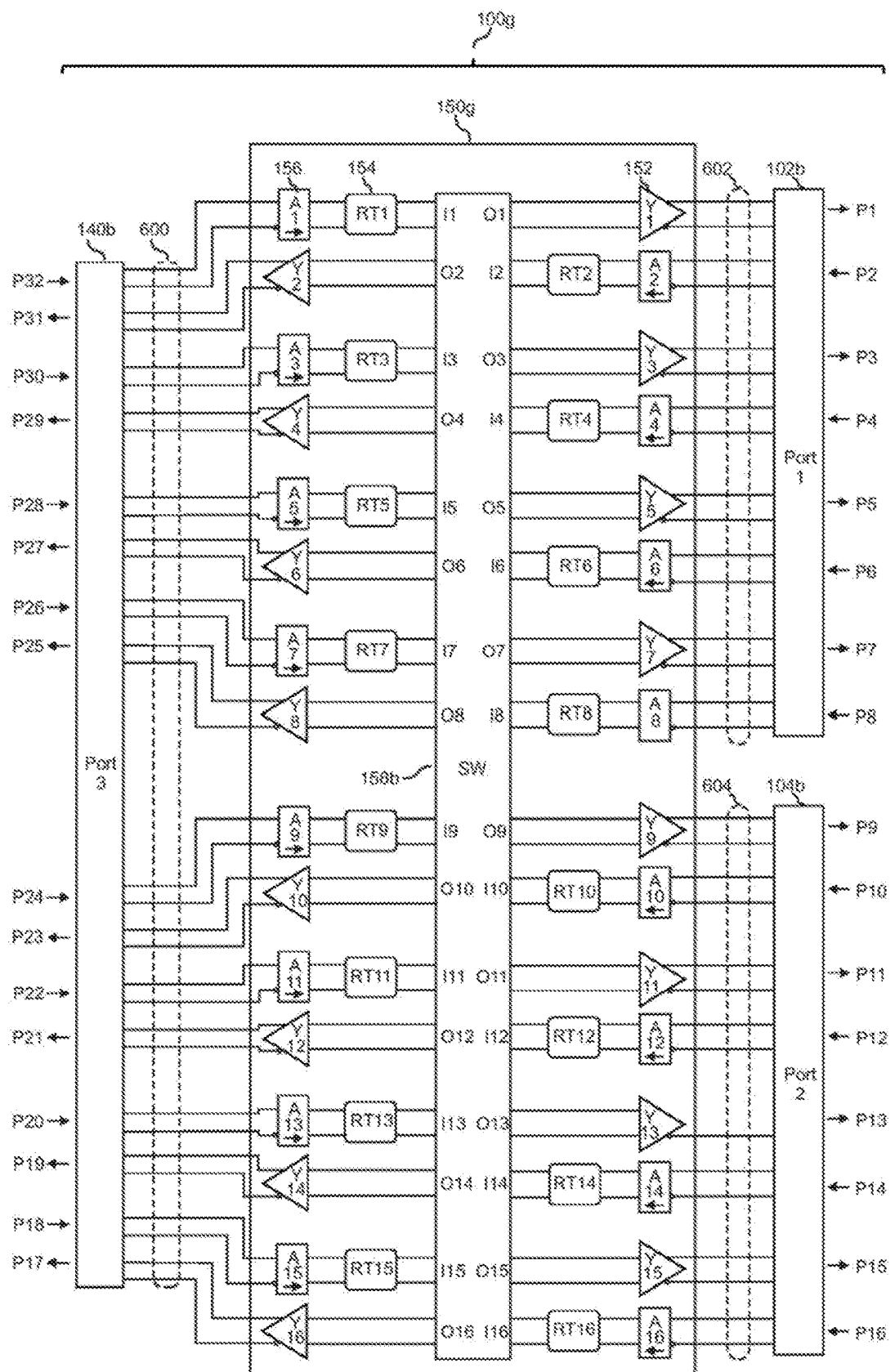
FIG. 21 is a schematic diagram illustrating another methods, systems, devices, circuitry and equipment of the present disclosure having circuitry used to amplify, equalize, retime, and switch differential signal paths between a QSFP-DD device and two QSFP28 devices.

As illustrated in FIG. 13, the Network is comprised of a Device 100*f* or 100*g* having three Ports 102*b*, 104*b*, and 140*b*, Communication Equipment 300 having a Port 302, Communication Equipment 310 having a Port 312, and Communication Equipment 400 having one Port 402. Cables 500*a*, 502*a*, and 504*a* can individually vary in length, type, and material for the given application. The individual cables can be replaced for repair or application changes. The Device 100*g* or 100*f* has a QSFP28 Device 232*a* connected to Port 102*b*, a QSFP28 Device 234*a* connected to Port 104*b*, and a QSFP-DD Device 240*a* connected to Port 140*b*. The Device 100*f* or 100*g* has Paths 602 and 604, which each Path defines four transmit and receive differential signal paths between the SFP Ports 102*b* and 104*b* and Circuitry 150*f* or 150*g* of the Device. Path 600 defines eight transmit and receive differential signal paths between the QSFP-DD Port 140*b* and the Circuitry 150*f* and 150*g* of the Device. The Circuitry 150*f* or 150*g* is comprised of input and output differential amplifiers and retimers through differential signal paths, as shown and discussed in more detail with respect to FIGS. 20 and 21 respectively. Device 100*f* has Circuitry 150*f* whereas Device 100*g* has Circuitry 150*g*. The Circuitry 150*g* of Device 100*g* has a cross-connect switch which provides non-blocking cross-connects between all Paths. Further details on Circuitry 150*f* and 150*g* are illustrated in FIGS. 20 and 21, respectively.

A fiber Cable 502*a* is used to interface four communication services between Communication Equipment 300 and Device 100*f* or 100*g*, specifically connecting the fiber Cable 502*a* from QSFP28 Device 232*a* in Port 102*b* of Device 100*f* or 100*g* to Port 302 of the Communication Equipment 300. A fiber Cable 504*a* is used to interface the four communication services between Communication Equipment 310 and Device 100*f* or 100*g*, specifically connecting the fiber Cable 504*a* from QSFP28 Device 234*a* in Port 104*b* to Port 312 of the Communication Equipment 310. The Device 100*f* or 100*g* in turn connects to the Communication Equipment 400 through a fiber Cable 500*a*, specifically connecting the QSFP-DD Device 240*a* in Port 140*b* of Device 100*f* or 100*g* to Port 402 of the Communication Equipment 400.

Figure 14:
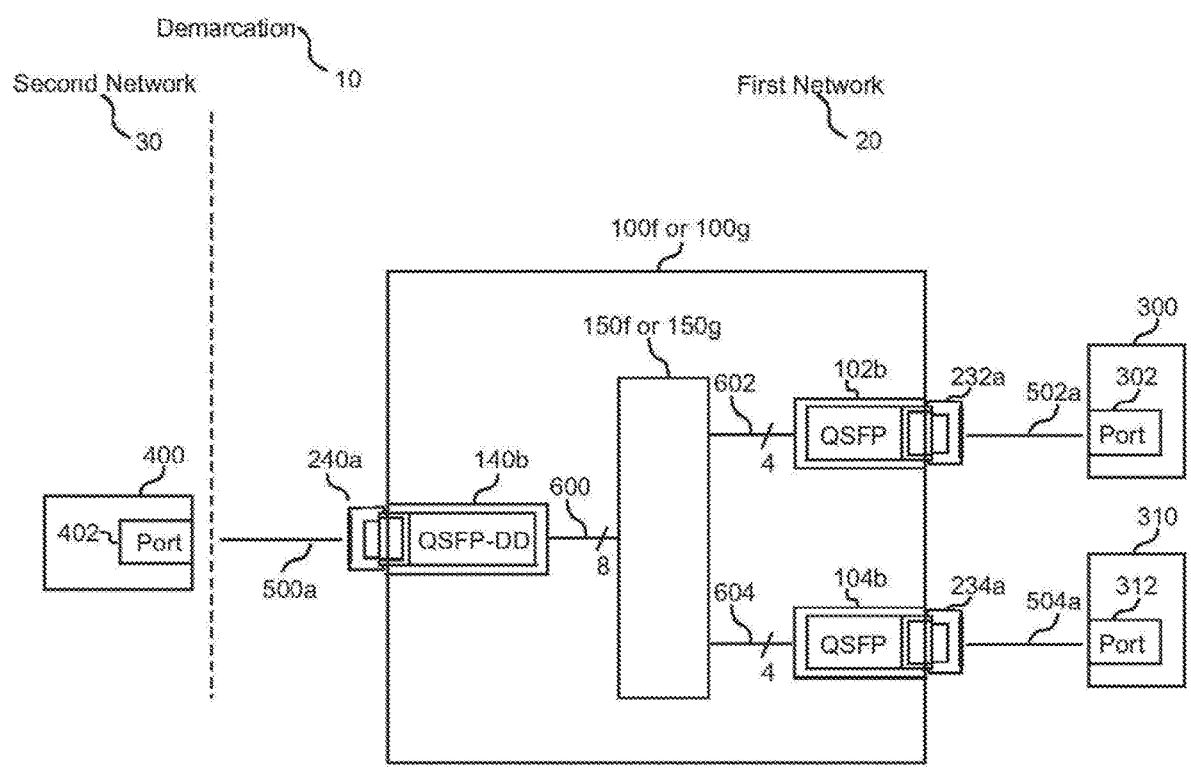
FIG. 14 is a block diagram illustrating methods, systems, devices, circuitry and equipment of the present disclosure establishing a Demarcation Point with a QSFP-DD device.

FIG. 14 illustrates a diagram of an embodiment of the communications system and equipment of the present disclosure, wherein a Device 100*f* or 100*g* of the present disclosure establishes a Demarcation Point 10 between a First Network 20 and a Second Network 30, specifically through QSFP-DD Device 240*a* in Port 140*b*, in communication with a Port 402 on the Communication Equipment 400 of the Second Network 30. The Device 100*f* or 100*g* provides a cost effective and efficient method and system of providing Demarcation Point on eight communication services by way of a single QSFP-DD Device 240*a*. This embodiment allows the use of different cabling types, cable lengths, and the ability to change and replace any cable or QSFP-DD, OSFP and QSFP28 type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power QSFP+, QSFP28, QSFP-DD, and OSFP devices.

As illustrated in FIG. 14, the First Network 20 is comprised of a Device 100*f* or 100*g* having three Ports 102*b*, 104*b*, and 140*b*, Communication Equipment 300 having a Port 302, and Communication Equipment 310 having a Port 312. Cables 500*a*, 502*a*, and 504*a* can individually vary in length, type, and material for the given application. The individual cables can be replaced for repair or application changes. The Device 100*g* or 100*f* has a QSFP28 Device 232*a* connected to Port 102*b*, a QSFP28 Device 234*a* connected to Port 104*b*, and a QSFP-DD Device 240*a* connected to Port 140*b*. The Device 100*f* or 100*g* has Paths 602 and 604, which each Path defines four transmit and receive differential signal paths between the SFP Ports 102*b* and 104*b* and Circuitry 150*f* or 150*g* of the Device. Path 600 defines eight transmit and receive differential signal paths between the QSFP-DD Port 140*b* and the Circuitry 150*f* and 150*g* of the Device. The Circuitry 150*f* or 150*g* is comprised of input and output differential amplifiers and retimers through differential signal paths. Device 100*f* has Circuitry 150*f* whereas Device 100*g* has Circuitry 150*g*. The Circuitry 150*g* of Device 100*g* has a cross-connect switch which provides non-blocking cross-connects between all Paths. Further details on Circuitry 150*f* and 150*g* are illustrated in FIGS. 20 and 21, respectively. The Second Network 30 includes Communication Equipment 400 having Port 402.

In this embodiment, the First Network 20 establishes a Demarcation Point 10 with Device 100*f* or 100*g* through QSFP-DD Device 240*a*. A fiber Cable 502*a* is used to interface four communication services between Communication Equipment 300 and Device 100*f* or 100*g*, specifically connecting the fiber Cable 502*a* from QSFP28 Device 232*a* in Port 102*b* of Device 100*f* or 100*g* to Port 302 of the Communication Equipment 300. A fiber Cable 504*a* is used to interface four communication services between Communication Equipment 310 and Device 100*f* or 100*g*, specifically connecting the fiber Cable 504*a* from QSFP28 Device 234*a* in Port 104*b* to Port 312 of the Communication Equipment 310. The Device 100*f* or 100*g* in turn connects to the Communication Equipment 400 through a fiber Cable 500*a*, specifically connecting the QSFP-DD Device 240*a* in Port 140b of Device 100f or 100g to Port 402 of the Communication Equipment 400.

Figure 15:
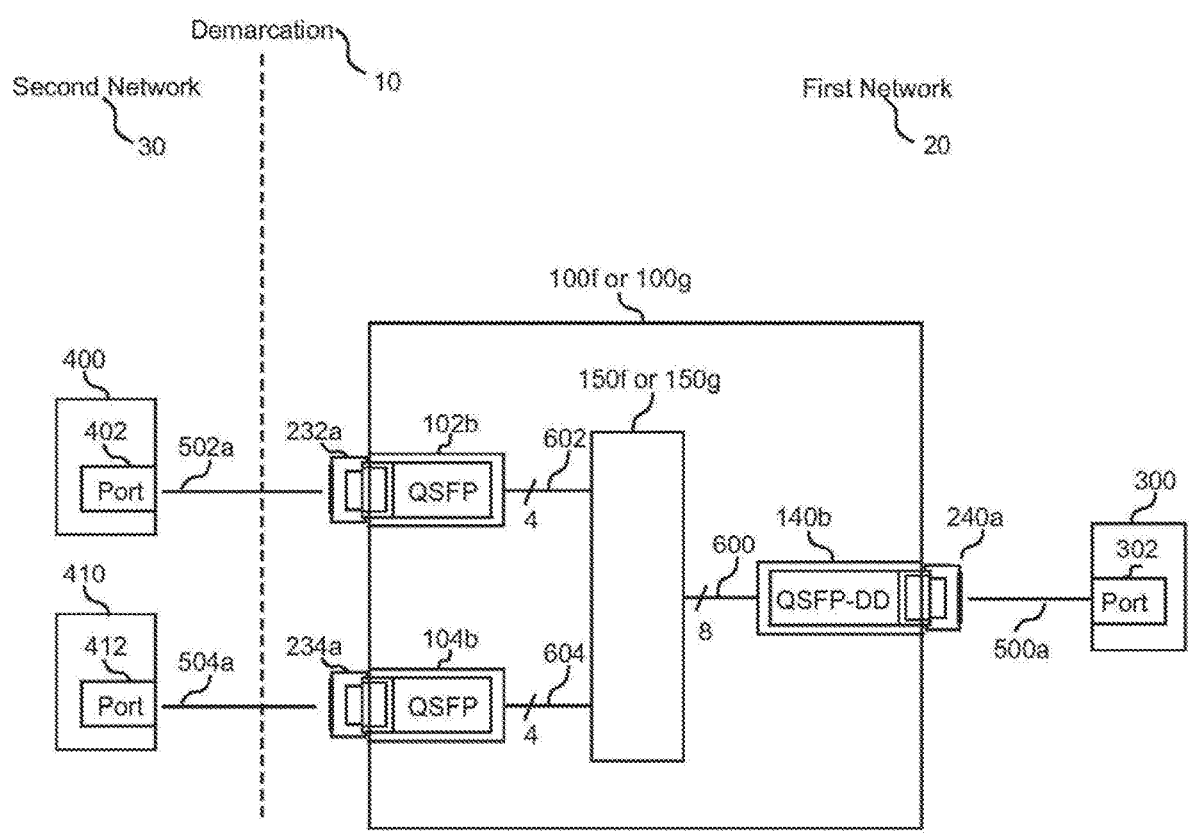
FIG. 15 is a block diagram illustrating methods, systems, devices, circuitry and equipment of the present disclosure establishing a Demarcation Point with two QSFP28 devices.

FIG. 15 illustrates a diagram of an embodiment of the communications system and equipment of the present disclosure, wherein a Device 100f or 100g of the present disclosure establishes a Demarcation Point 10 between a First Network 20 and a Second Network 30, specifically through QSFP28 Device 232a in Port 102b, in communication with a Port 402 on the Communication Equipment 400 of the Second Network 30 and QSFP28 Device 234a in Port 104b, in communication with a Port 412 on the Communication Equipment 410 of the Second Network 30. The Device 100f or 100g provides a cost effective and efficient method and system of providing Demarcation Point on eight communication services by way of a single QSFP-DD Device 240a. This embodiment allows the use of different cabling types, cable lengths, and the ability to change and replace any cable or QSFP-DD, OSFP, QSFP28, other QSFP type devices. This embodiment allows the communication services to be aggregated from separate communication equipment and different equipment locations. This embodiment also allows the communication equipment to extend communication services, provide the communication equipment a method to manage heat dissipation on communication equipment, and provide the communication equipment a method to manage power usage, by having the communication equipment use lower power QSFP+, QSFP28, QSFP-DD, and OSFP devices.

As illustrated in FIG. 15, the First Network 20 is comprised of a Device 100f or 100g having three Ports 102b, 104b, and 140b, and Communication Equipment 300 having a Port 302. Cables 500a, 502a, and 504a can individually vary in length, type, and material for the given application. The individual cables can be replaced for repair or application changes. The Device 100g or 100f has a QSFP28 Device 232a connected to Port 102b, a QSFP28 Device 234a connected to Port 104b, and a QSFP-DD Device 240a connected to Port 140b. The Device 100f or 100g has Paths 602 and 604, which each Path defines four transmit and receive differential signal paths between the SFP Ports 102b and 104b and Circuitry 150f or 150g of the Device. Path 600 defines eight transmit and receive differential signal paths between the QSFP-DD Port 140b and the Circuitry 150f and 150g of the Device. The Circuitry 150f or 150g is comprised of input and output differential amplifiers and retimers through differential signal paths. Device 100f has Circuitry 150f whereas Device 100g has Circuitry 150g. The Circuitry 150g of Device 100g has a cross-connect switch which provides non-blocking cross-connects between all Paths. Further details on Circuitry 150f and 150g are illustrated in FIGS. 20 and 21, respectively. The Second Network 30 includes Communication Equipment 400 having Port 402 and Communication Equipment 410 having Port 412.

In this embodiment, the First Network 20 establishes a Demarcation Point 10 with Device 100f or 100g through QSFP28 Device 232a and 234a. A fiber Cable 502a is used to interface four communication services between Communication Equipment 400 and Device 100f or 100g, specifically connecting the fiber Cable 502a from QSFP28 Device 232a in Port 102b of Device 100f or 100g to Port 402 of the Communication Equipment 400. A fiber Cable 504a is used to interface the four communication services between Communication Equipment 410 and Device 100f or 100g, specifically connecting the fiber Cable 504a from QSFP28 Device 234a in Port 104b to Port 412 of the Communication Equipment 410. The Device 100f or 100g in turn connects to the Communication Equipment 300 through a fiber Cable 500a, specifically connecting the QSFP-DD Device 240a in Port 140b of Device 100f or 100g to Port 302 of the Communication Equipment 300.

FIG. 16 illustrates a schematic diagram of one embodiment of the Circuitry 150a of the present disclosure, representing for example a communication Device 100a with a plurality of Port connectors 102a, 104a, 106a, 108a, and 140a, which are each connected to an input and output differential amplifier, wherein the differential amplifiers connect to a retimer. As shown in FIG. 16, the communication Device 100a port connectors Port 102a, Port 104a, Port 106a, and Port 108a, also correspondingly represented as Port 1, Port 2, Port 3, and Port 4 respectively, are each configured to interface two differential signal paths, specifically a transmit and receive differential signal path from a Network. The communication Device 100a port connector Port 140a also represented as Port 5, is configured to interface eight differential signal paths, specifically four transmit and receive differential signal paths from a Network. Further, in use, a SFP Device as described above is inserted into Port 102a, Port 104a, Port 106a, and Port 108a and a QSFP Device as described above is inserted into Port 140a. The QSFP and SFP Devices connect to one or more cables as described above. The QSFP and SFP Devices can be alternatively replaced by various other derivatives of QSFP and SFP Devices, respectively.

More specifically, FIG. 16 illustrates a diagram of Circuitry 150a of the present disclosure involving five Ports and sixteen differential signal paths. Port 1 has two differential signal paths P1 and P2, represented as 602. Port 2 has two differential signal paths P3 and P4, represented as 604. Port 3 has two differential signal paths P5 and P6, represented as 606. Port 4 has two differential signal paths P7 and P8, represented as 608. Port 5 has eight differential signal paths P9, P10, P11, P12, P13, P14, P15, and P16, represented as 600.

As illustrated in FIG. 16, there are eight input broadband differential amplifiers A1, A2, A3, A4, A5, A6, A7, and A8, represented collectively as 156. The broadband differential amplifiers provide amplification and conditioning of the input signal. There are eight retimers RT1, RT2, RT3, RT4, RT5, RT6, RT7, and RT8, represented collectively as 154. The retimers extract timing from the input signals and retransmit the signal with a corrected timing. The retimer removes jitter and inter-symbol interference from the input signal. There are eight high speed output differential amplifiers Y1, Y2, Y3, Y4, Y5, Y6, Y7, and Y8, represented collectively as 152. The high speed output differential amplifiers provide fixed or variable output voltages with and without pre-emphasis. Highly integrated circuits (IC) incorporate the input broadband differential amplifiers, retimers, and the output broadband differential amplifiers. Low latency of 350 ps and lower are achieved with using differential signal paths between the input differential amplifiers A, the output differential amplifiers Y, and retimers RT.

Port 1 comprises a path P1 representing an output differential signal and a path P2 representing an input differential signal. Port 2 comprises a path P3 representing an output differential signal and a path P4 representing an input differential signal. Port 3 comprises a path P5 representing an output differential signal and a path P6 representing an input differential signal. Port 4 comprises a path P7 representing an output differential signal and a path P8 representing an input differential signal. Port 5 comprises a path P9 representing an output differential signal, a path P10 representing an input differential signal, a path P11 representing an output differential signal, a path P12 representing an input differential signal, a path P13 representing an output differential signal, a path P14 representing an input differential signal, a path P15 representing an output differential signal, and a path P16 representing an input differential signal.

Path P1 output differential signals connect to the output differential amplifier Y1. The input signal to differential amplifier Y1 can be a differential or common-mode signal. This input signal to differential amplifier Y1 connects to the output of retimer RT1.

Path P2 input differential signals connect to the input differential amplifier A2. The output signal from differential amplifier A2 can be a differential or common-mode signal. This output signal from differential amplifier A2 connects to the input of retimer RT2.

Path P3 output differential signals connect to the output differential amplifier Y3. The input signal to differential amplifier Y3 can be a differential or common-mode signal. This input signal to differential amplifier Y3 connects to the output of retimer RT3.

Path P4 input differential signals connect to the input differential amplifier A4. The output signal from differential amplifier A4 can be a differential or common-mode signal. This output signal from differential amplifier A4 connects to the input of retimer RT4.

Path P5 output differential signals connect to the output differential amplifier Y5. The input signal to differential amplifier Y5 can be a differential or common-mode signal. This input signal to differential amplifier Y5 connects to the output of retimer RT5.

Path P6 input differential signals connect to the input differential amplifier A6. The output signal from differential amplifier A6 can be a differential or common-mode signal. This output signal from differential amplifier A6 connects to the input of retimer RT6.

Path P7 output differential signals connect to the output differential amplifier Y7. The input signal to differential amplifier Y7 can be a differential or common-mode signal. This input signal to differential amplifier Y7 connects to the output of retimer RT7.

Path P8 input differential signals connect to the input differential amplifier A8. The output signal from differential amplifier A8 can be a differential or common-mode signal. This output signal from differential amplifier A8 connects to the input of retimer RT8.

Path P9 output differential signals connect to the output differential amplifier Y8. The input signal to differential amplifier Y8 can be a differential or common-mode signal. This input signal to differential amplifier Y8 connects to the output of retimer RT8.

Path P10 input differential signals connect to the input differential amplifier A7. The output signal from differential amplifier A7 can be a differential or common-mode signal. This output signal from differential amplifier A7 connects to the input of retimer RT7.

Path P11 output differential signals connect to the output differential amplifier Y6. The input signal to differential amplifier Y6 can be a differential or common-mode signal. This input signal to differential amplifier Y6 connects to the output of retimer RT6.

Path P12 input differential signals connect to the input differential amplifier A5. The output signal from differential amplifier A5 can be a differential or common-mode signal. This output signal from differential amplifier A5 connects to the input of retimer RT5.

Path P13 output differential signals connect to the output differential amplifier Y4. The input signal to differential amplifier Y4 can be a differential or common-mode signal. This input signal to differential amplifier Y4 connects to the output of retimer RT4.

Path. P14 input differential signals connect to the input differential amplifier A3. The output signal from differential amplifier A3 can be a differential or common-mode signal. This output signal from differential amplifier A3 connects to the input of retimer RT3.

Path P15 output differential signals connect to the output differential amplifier Y2. The input signal to differential amplifier Y2 can be a differential or common-mode signal. This input signal to differential amplifier Y2 connects to the output of retimer RT2.

Path P16 input differential signals connect to the input differential amplifier A1. The output signal from differential amplifier A1 can be a differential or common-mode signal. This output signal from differential amplifier A1 connects to the input of retimer RT1.

FIG. 17 illustrates a schematic diagram of one embodiment of the Circuitry 150b of the present disclosure, representing for example a communication Device 100b with a plurality of Port connectors 102a, 104a, 106a, 108a, and 140a, which are each connected to an input and output differential amplifier, wherein the input differential amplifier connects to a cross-point switch, the cross-point switch connects to the retimer, and the retimer connects to the output differential amplifier. As shown in FIG. 17, the communication Device 100b port connectors Port 102a, Port 104a, Port 106a, and Port 108a also correspondingly represented as Port 1, Port 2, Port 3, and Port 4 respectively, are each configured to interface two differential signal paths, specifically a transmit and receive differential signal path from a Network. The communication Device 100b port connector Port 140a also represented as Port 5, is configured to interface eight differential signal paths, specifically four transmit and receive differential signal paths to a Network. Further, in use, a SFP Device as described above is inserted into Port 102a, Port 104a, Port 106a, and Port 108a and a QSFP Device as described above is inserted into Port 140a. The QSFP and SFP Devices connect to one or more cables as described above. The QSFP and SFP Devices can be alternatively replaced by various other derivatives of QSFP and SFP Devices, respectively.

More specifically, FIG. 17 illustrates a diagram of Circuitry 150b of the present disclosure involving five Ports and sixteen differential signal paths. Port 1 has two differential signal paths P1 and P2, represented as 602. Port 2 has two differential signal paths P3 and P4, represented as 604. Port 3 has two differential signal paths P5 and P6, represented as 606. Port 4 has two differential signal paths P7 and P8, represented as 608. Port 5 has eight differential signal paths P9, P10, P11, P12, P13, P14, P15, and P16, represented as 600.

As illustrated in FIG. 17, there are eight input broadband differential amplifiers A1, A2, A3, A4, A5, A6, A7, and A8, represented collectively as 156. The broadband differential amplifiers provide amplification and conditioning of the input signal. There are eight retimers RT1, RT2, RT3, RT4, RT5, RT6, RT7, and RT8, represented collectively as 154. The retimers extract timing from the input signals and retransmit the signal with a corrected timing. The retimer removes jitter and inter-symbol interference from the input signal. There is an 8×8 non-blocking cross-point switch SW, represented as 158a. The 8×8 non-blocking cross-point Switch 158a allows any output O to be connected to any input I of the switch SW. There are eight high speed output differential amplifiers Y1, Y2, Y3, Y4, Y5, Y6, Y7, and Y8, represented collectively as 152. The high speed output differential amplifiers provide fixed or variable output voltages with and without pre-emphasis. Highly integrated circuits (IC) incorporate the input broadband differential amplifiers, retimers, and the output broadband differential amplifiers. Low latency of 350 ps and lower are achieved with using differential signal paths between the input differential amplifiers A, the output differential amplifiers Y, the retimers RT, and the cross-point switch SW.

Port 1 comprises a path P1 representing an output differential signal and a path P2 representing an input differential signal. Port 2 comprises a path P3 representing an output differential signal and a path P4 representing an input differential signal. Port 3 comprises a path P5 representing an output differential signal and a path P6 representing an input differential signal. Port 4 comprises a path P7 representing an output differential signal and a path P8 representing an input differential signal. Port 5 comprises a path P9 representing an output differential signal, a path P10 representing an input differential signal, a path P11 representing an output differential signal, a path P12 representing an input differential signal, a path P13 representing an output differential signal, a path P14 representing an input differential signal, a path P15 representing an output differential signal, and a path P16 representing an input differential signal.

Path P1 output differential signals connect to the output differential amplifier Y1. The input signal to differential amplifier Y1 can be a differential or common-mode signal. This input signal to differential amplifier Y1 connects to the output O1 of the cross-point switch SW.

Path P2 input differential signals connect to the input differential amplifier A2. The output signal from differential amplifier A2 can be a differential or common-mode signal. This output signal from differential amplifier A2 connects to the input of retimer RT2. The output of the retimer RT2 connects to the input I2 of the cross-point switch SW.

Path P3 output differential signals connect to the output differential amplifier Y3. The input signal to differential amplifier Y3 can be a differential or common-mode signal. This input signal to differential amplifier Y3 connects to the output O3 of the cross-point switch SW.

Path P4 input differential signals connect to the input differential amplifier A4. The output signal from differential amplifier A4 can be a differential or common-mode signal. This output signal from differential amplifier A4 connects to the input of retimer RT4. The output of the retimer RT4 connects to the input I4 of the cross-point switch SW.

Path P5 output differential signals connect to the output differential amplifier Y5. The input signal to differential amplifier Y5 can be a differential or common-mode signal. This input signal to differential amplifier Y5 connects to the output O5 of the cross-point switch SW.

Path P6 input differential signals connect to the input differential amplifier A6. The output signal from differential amplifier A6 can be a differential or common-mode signal. This output signal from differential amplifier A6 connects to the input of retimer RT6. The output of the retimer RT6 connects to the input I6 of the cross-point switch SW.

Path P7 output differential signals connect to the output differential amplifier Y7. The input signal to differential amplifier Y7 can be a differential or common-mode signal. This input signal to differential amplifier Y7 connects to the output O7 of the cross-point switch SW.

Path P8 input differential signals connect to the input differential amplifier A8. The output signal from differential amplifier A8 can be a differential or common-mode signal. This output signal from differential amplifier A8 connects to the input of retimer RT8. This output of the retimer RT8 connects to the input I8 of the cross-point switch SW.

Path P9 output differential signals connect to the output differential amplifier Y8. The input signal to differential amplifier Y8 can be a differential or common-mode signal. This input signal to differential amplifier Y8 connects to the output O8 of the cross-point switch SW.

Path P10 input differential signals connect to the input differential amplifier A7. The output signal from differential amplifier A7 can be a differential or common-mode signal. This output signal from differential amplifier A7 connects to the input of the retimer RT7. The output of the retimer RT7 connects to the input I7 of cross-point switch SW.

Path P11 output differential signals connect to the output differential amplifier Y6. The input signal to differential amplifier Y6 can be a differential or common-mode signal. This input signal to differential amplifier Y6 connects to the output O6 of the cross-point switch SW.

Path P12 input differential signals connect to the input differential amplifier A5. The output signal from differential amplifier A5 can be a differential or common-mode signal. This output signal from differential amplifier A5 connects to the input of the retimer RT5. The output of the retimer RT5 connects to the input I5 of cross-point switch SW.

Path P13 output differential signals connect to the output differential amplifier Y4. The input signal to differential amplifier Y4 can be a differential or common-mode signal. This input signal to differential amplifier Y4 connects to the output O4 of the cross-point switch SW.

Path P14 input differential signals connect to the input differential amplifier A3. The output signal from differential amplifier A3 can be a differential or common-mode signal. This output signal from differential amplifier A3 connects to the input of the retimer RT3. The output of the retimer RT3 connects to the input I3 of cross-point switch SW.

Path P15 output differential signals connect to the output differential amplifier Y2. The input signal to differential amplifier Y2 can be a differential or common-mode signal. This input signal to differential amplifier Y2 connects to the output O2 of the cross-point switch SW.

Path P16 input differential signals connect to the input differential amplifier A1. The output signal from differential amplifier A1 can be a differential or common-mode signal. This output signal from differential amplifier A1 connects to the input of the retimer RT1. The output of the retimer RT1 connects to the input I1 of cross-point switch SW.

FIG. 18 illustrates a schematic diagram of one embodiment of the Circuitry 150*d* of the present disclosure, representing for example a communication Device 100*d* with a plurality of Port connectors 102*a*, 104*a*, 106*a*, 108*a*, 110*a*, 112*a*, 114*a*, 116*a*, and 140*b*, which are each connected to an input and output differential amplifier, wherein the differential amplifier connects to a retimer. As shown in FIG. 18, the communication Device 100*d* eight port connectors Port 102*a*, Port 104*a*, Port 106*a*, Port 108*a*, Port 110*a*, Port 112*a*, Port 114*a*, and Port 116*a* also correspondingly represented as Port 1, Port 2, Port 3, Port 4, Port 5, Port 6, Port 7, and Port 8 respectively, are each configured to interface two differential signal paths, specifically a transmit and receive differential signal path, to a Network. The communication Device 100*d* connector Port 140*b* also represented as Port 9 is configured to interface sixteen differential signal paths, specifically eight transmit and receive differential signal paths, to the Network. Further, in use, a SFP Device as described above is inserted into Port 102*a*, Port 104*a*, Port 106*a*, Port 108*a*, Port 110*a*, Port 112*a*, Port 114*a* and Port 116a and a QSFP-DD Device as described above is inserted into Port 140b. The QSFP-DD and SFP28 Devices connect to one or more cables as described above. The QSFP-DD and SFP28 Devices can be alternatively replaced by various other derivatives of QSFP-DD and SFP28 Devices, respectively.

More specifically, FIG. 18 illustrates a diagram of Circuitry 150d of the present disclosure involving nine Ports and thirty two differential signal paths. Port 1 has two differential signal paths P1 and P2, represented as 602. Port 2 has two differential signal paths P3 and P4, represented as 604. Port 3 has two differential signal paths P5 and P6, represented as 606. Port 4 has two differential signal paths P7 and P8, represented as 608. Port 5 has two differential signal paths P9 and P10, represented as 610. Port 6 has two differential signal paths P11 and P12, represented as 612. Port 7 has two differential signal paths P13 and P14, represented as 614. Port 8 has two differential signal paths P15 and P16, represented as 616. Port 9 has sixteen differential signal paths P17, P18, P19, P20, P21, P22, P23, P24, P25, P26, P27, P28, P29, P30, P31, and P32, represented as 600.

As illustrated in FIG. 18, there are sixteen input broadband differential amplifiers A1, A2, A3, A4, A5, A6, A7, A8, A9, A10, A11, A12, A13, A14, A15, and A16, represented collectively as 156. The broadband differential amplifiers provide amplification and conditioning of the input signal. There are sixteen retimers RT1, RT2, RT3, RT4, RT5, RT6, RT7, RT8, RT9, RT10, RT11, RT12, RT13, RT14, RT15, and RT16, represented collectively as 154. The retimers extract timing from the input signals and retransmit the signal with a corrected timing. The retimer removes jitter and intersymbol interference from the input signal. There are sixteen high speed output differential amplifiers Y1, Y2, Y3, Y4, Y5, Y6, Y7, Y8, Y9, Y10, Y11, Y12, Y13, Y14, Y15, and Y16, represented collectively as 152. The high speed output differential amplifiers provide fixed or variable output voltages with and without pre-emphasis. Highly integrated circuits (IC) incorporate the input broadband differential amplifiers, retimers, and the output broadband differential amplifiers. Low latency of 350 ps and lower are achieved with using differential signal paths between the input differential amplifiers A, the output differential amplifiers Y, and the retimers RT.

Port 1 comprises a path P1 representing an output differential signal and a path P2 representing an input differential signal. Port 2 comprises a path P3 representing an output differential signal and a path P4 representing an input differential signal. Port 3 comprises a path P5 representing an output differential signal and a path P6 representing an input differential signal. Port 4 comprises a path P7 representing an output differential signal and a path P8 representing an input differential signal. Port 5 comprises a path P9 representing an output differential signal and a path P10 representing an input differential signal. Port 6 comprises a path P11 representing an output differential signal and a path P12 representing an input differential signal. Port 7 comprises a path P13 representing an output differential signal and a path P14 representing an input differential signal. Port 8 comprises a path P15 representing an output differential signal and a path P16 representing an input differential signal. Port 9 comprises a path P17 representing an output differential signal, a path P18 representing an input differential signal, a path P19 representing an output differential signal, a path P20 representing an input differential signal, a path P21 representing an output differential signal, a path P22 representing an input differential signal, a path P23 representing an output differential signal, and a path P24 representing an input differential signal, a path P25 representing an output differential signal, a path P26 representing an input differential signal, a path P27 representing an output differential signal, a path P28 representing an input differential signal, a path P29 representing an output differential signal, a path P30 representing an input differential signal, a path P31 representing an output differential signal, and a path P32 representing an input differential signal.

Path P1 output differential signals connect to the output differential amplifier Y1. The input signal to differential amplifier Y1 can be a differential or common-mode signal. This input signal to differential amplifier Y1 connects to the output of retimer RT1.

Path P2 input differential signals connect to the input differential amplifier A2. The output signal from differential amplifier A2 can be a differential or common-mode signal. This output signal from differential amplifier A2 connects to the input of retimer RT2.

Path P3 output differential signals connect to the output differential amplifier Y3. The input signal to differential amplifier Y3 can be a differential or common-mode signal. This input signal to differential amplifier Y3 connects to the output of retimer RT3.

Path P4 input differential signals connect to the input differential amplifier A4. The output signal from differential amplifier A4 can be a differential or common-mode signal. This output signal from differential amplifier A4 connects to the input of retimer RT4.

Path P5 output differential signals connect to the output differential amplifier Y5. The input signal to differential amplifier Y5 can be a differential or common-mode signal. This input signal to differential amplifier Y5 connects to the output of retimer RT5.

Path P6 input differential signals connect to the input differential amplifier A6. The output signal from differential amplifier A6 can be a differential or common-mode signal. This output signal from differential amplifier A6 connects to the input of retimer RT6.

Path P7 output differential signals connect to the output differential amplifier Y7. The input signal to differential amplifier Y7 can be a differential or common-mode signal. This input signal to differential amplifier Y7 connects to the output of retimer RT7.

Path P8 input differential signals connect to the input differential amplifier A8. The output signal from differential amplifier A8 can be a differential or common-mode signal. This output signal from differential amplifier A8 connects to the input of retimer RT8.

Path P9 output differential signals connect to the output differential amplifier Y9. The input signal to differential amplifier Y9 can be a differential or common-mode signal. This input signal to differential amplifier Y9 connects to the output of retimer RT9.

Path P10 input differential signals connect to the input differential amplifier A10. The output signal from differential amplifier A10 can be a differential or common-mode signal. This output signal from differential amplifier A10 connects to the input of retimer RT10.

Path P11 output differential signals connect to the output differential amplifier Y11. The input signal to differential amplifier Y11 can be a differential or common-mode signal. This input signal to differential amplifier Y11 connects to the output of retimer RT11.

Path P12 input differential signals connect to the input differential amplifier A12. The output signal from differential amplifier A12 can be a differential or common-mode signal. This output signal from differential amplifier A12 connects to the input of retimer RT12.

Path P13 output differential signals connect to the output differential amplifier Y13. The input signal to differential amplifier Y13 can be a differential or common-mode signal. The input signal to differential amplifier Y13 connects to the output of retimer RT13.

Path P14 input differential signals connect to the input differential amplifier A14. The output signal from differential amplifier A14 can be a differential or common-mode signal. This output signal from differential amplifier A14 connects to the input of retimer RT14.

Path P15 output differential signals connect to the output differential amplifier Y15. The input signal to differential amplifier Y15 can be a differential or common-mode signal. This input signal to differential amplifier Y15 connects to the output of retimer RT15.

Path P16 input differential signals connect to the input differential amplifier A16. The output signal from differential amplifier A16 can be a differential or common-mode signal. This output signal from differential amplifier A16 connects to the input of retimer RT16.

Path P17 output differential signals connect to the output differential amplifier Y16. The input signal to differential amplifier Y16 can be a differential or common-mode signal. This input signal to differential amplifier Y16 connects to the output of retimer RT16.

Path P18 input differential signals connect to the input differential amplifier A15. The output signal from differential amplifier A15 can be a differential or common-mode signal. This output signal from differential amplifier A15 connects to the input of retimer RT15.

Path P19 output differential signals connect to the output differential amplifier Y14. The input signal to differential amplifier Y14 can be a differential or common-mode signal. This input signal to differential amplifier Y14 connects to the output of retimer RT14.

Path P20 input differential signals connect to the input differential amplifier A13. The output signal from differential amplifier A13 can be a differential or common-mode signal. This output signal from differential amplifier A13 connects to the input of retimer RT13.

Path P21 output differential signals connect to the output differential amplifier Y12. The input signal to differential amplifier Y12 can be a differential or common-mode signal. This input signal to differential amplifier Y12 connects to the output of retimer RT12.

Path P22 input differential signals connect to the input differential amplifier A11. The output signal from differential amplifier A11 can be a differential or common-mode signal. This output signal from differential amplifier A11 connects to the input of retimer RT11.

Path P23 output differential signals connect to the output differential amplifier Y10. The input signal to differential amplifier Y10 can be a differential or common-mode signal. This input signal to differential amplifier Y10 connects to the output of retimer RT10.

Path P24 input differential signals connect to the input differential amplifier A9. The output signal from differential amplifier A9 can be a differential or common-mode signal. This output signal from differential amplifier A9 connects to the input of retimer RT9.

Path P25 output differential signals connect to the output differential amplifier Y8. The input signal to differential amplifier Y8 can be a differential or common-mode signal. This input signal to differential amplifier Y8 connects to the output of retimer RT8.

Path P26 input differential signals connect to the input differential amplifier A7. The output signal from differential amplifier A7 can be a differential or common-mode signal. This output signal from differential amplifier A7 connects to the input of retimer RT7.

Path P27 output differential signals connect to the output differential amplifier Y6. The input signal to differential amplifier Y6 can be a differential or common-mode signal. This input signal to differential amplifier Y6 connects to the output of retimer RT6.

Path P28 input differential signals connect to the input differential amplifier A5. The output signal from differential amplifier A5 can be a differential or common-mode signal. This output signal from differential amplifier A5 connects to the input of retimer RT5.

Path P29 output differential signals connect to the output differential amplifier Y4. The input signal to differential amplifier Y4 can be a differential or common-mode signal. The input signal to differential amplifier Y4 connects to the output of retimer RT4.

Path P30 input differential signals connect to the input differential amplifier A3. The output signal from differential amplifier A3 can be a differential or common-mode signal. This output signal from differential amplifier A3 connects to the input of retimer RT3.

Path P31 output differential signals connect to the output differential amplifier Y2. The input signal to differential amplifier Y2 can be a differential or common-mode signal. This input signal to differential amplifier Y2 connects to the output of retimer RT2.

Path P32 input differential signals connect to the input differential amplifier A1. The output signal from differential amplifier A1 can be a differential or common-mode signal. This output signal from differential amplifier A1 connects to the input of retimer RT1.

FIG. 19 illustrates a schematic diagram of one embodiment of the Circuitry 150e of the present disclosure, representing for example a communication Device 100e with a plurality of Port connectors 102a, 104a, 106a, 108a, 110a, 112a, 114a, 116a, and 140b, which are each connected to an input and output differential amplifier, wherein the input differential amplifier connects to a cross-point switch, the cross-point switch connects to the retimer, the retimer connects to the output differential amplifier. As shown in FIG. 19, the communication Device 100e eight port connectors Port 102a, Port 104a, Port 106a, Port 108a, Port 110a, Port 112a, Port 114a, and Port 116a also correspondingly represented as Port 1, Port 2, Port 3, Port 4, Port 5, Port 6, Port 7, and Port 8 respectively, are each configured to interface two differential signal paths, specifically a transmit and receive differential signal path, to a Network. The communication Device 100e connector Port 140b also represented as Port 9 is configured to interface sixteen differential signal paths, specifically eight transmit and receive differential signal paths, to a Network. Further, in use, a SFP Device as described above is inserted into Port 102a, Port 104a, Port 106a, Port 108a, Port 110a, Port 112a, Port 114a and Port 116a and a QSFP-DD Device as described above is inserted into Port 140b. The QSFP-DD and SFP Devices connect to one or more cables as described above. The QSFP-DD and SFP Device can be alternatively replaced by various other derivatives of QSFP-DD and SFP Devices, respectively.

More specifically, FIG. 19 illustrates a diagram of Circuitry 150e of the present disclosure involving nine Ports and thirty-two differential signal paths. Port 1 has two differential signal paths P1 and P2, represented as 602. Port 2 has two differential signal paths P3 and P4, represented as

604. Port 3 has two differential signal paths P5 and P6, represented as 606. Port 4 has two differential signal paths P7 and P8, represented as 608. Port 5 has two differential signal paths P9 and P10, represented as 610. Port 6 has two differential signal paths P11 and P12, represented as 612. Port 7 has two differential signal paths P13 and P14, represented as 614. Port 8 has two differential signal paths P15 and P16, represented as 616. Port 9 has sixteen differential signal paths P17, P18, P19, P20, P21, P22, P23, P24, P25, P26, P27, P28, P29, P30, P31, and P32, represented as 130.

As illustrated in FIG. 19, there are sixteen input broadband differential amplifiers A1, A2, A3, A4, A5, A6, A7, A8, A9, A10, A11, A12, A13, A14, A15, and A16, represented collectively as 156. The broadband differential amplifiers provide amplification and conditioning of the input signal. There are sixteen retimers RT1, RT2, RT3, RT4, RT5, RT6, RT7, RT8, RT9, RT10, RT11, RT12, RT13, RT14, RT15, and RT16, represented collectively as 154. The retimers extract timing from the input signals and retransmit the signal with a corrected timing. The retimer removes jitter and intersymbol interference from the input signal. There is a 16×16 non-blocking cross-point switch SW, represented as 158b. The 16×16 non-blocking cross-point Switch 158b allows any output O to be connected to any input I of the switch SW. There are sixteen high speed output differential amplifiers Y1, Y2, Y3, Y4, Y5, Y6, Y7, Y8, Y9, Y10, Y11, Y12, Y13, Y14, Y15, and Y16, represented collectively as 152. The high speed output differential amplifiers provide fixed or variable output voltages with and without pre-emphasis. Highly integrated circuits (IC) incorporate the input broadband differential amplifiers, retimers, and the output broadband differential amplifiers. Low latency of 350 ps and lower are achieved with using differential signal paths between the input differential amplifiers A, the output differential amplifiers Y, the retimers RT, and the cross-point switch SW.

Port 1 comprises a path P1 representing an output differential signal and a path P2 representing an input differential signal. Port 2 comprises a path P3 representing an output differential signal and a path P4 representing an input differential signal. Port 3 comprises a path P5 representing an output differential signal and a path P6 representing an input differential signal. Port 4 comprises a path P7 representing an output differential signal and a path P8 representing an input differential signal. Port 5 comprises a path P9 representing an output differential signal and a path P10 representing an input differential signal. Port 6 comprises a path P11 representing an output differential signal and a path P12 representing an input differential signal. Port 7 comprises a path P13 representing an output differential signal and a path P14 representing an input differential signal. Port 8 comprises a path P15 representing an output differential signal and a path P16 representing an input differential signal. Port 9 comprises a path P17 representing an output differential signal, a path P18 representing an input differential signal, a path P19 representing an output differential signal, a path P20 representing an input differential signal, a path P21 representing an output differential signal, a path P22 representing an input differential signal, a path P23 representing an output differential signal, and a path P24 representing an input differential signal, a path P25 representing an output differential signal, a path P26 representing an input differential signal, a path P27 representing an output differential signal, a path P28 representing an input differential signal, a path P29 representing an output differential signal, a path P30 representing an input differential signal, a path P31 representing an output differential signal, and a path P32 representing an input differential signal.

Path P1 output differential signals connect to the output differential amplifier Y1. The input signal to differential amplifier Y1 can be a differential or common-mode signal. This input signal to differential amplifier Y1 connects to the output O1 of cross-point switch SW.

Path P2 input differential signals connect to the input differential amplifier A2. The output signal from differential amplifier A2 can be a differential or common-mode signal. This output signal from differential amplifier A2 connects to the input of retimer RT2. The output of retimer RT2 connects to input I2 of the cross-point switch SW.

Path P3 output differential signals connect to the output differential amplifier Y3. The input signal to differential amplifier Y3 can be a differential or common-mode signal. This input signal to differential amplifier Y3 connects to the output O3 of cross-point switch SW.

Path P4 input differential signals connect to the input differential amplifier A4. The output signal from differential amplifier A4 can be a differential or common-mode signal. This output signal from differential amplifier A4 connects to the input of retimer RT4. The output of retimer RT4 connects to input I4 of the cross-point switch SW.

Path P5 output differential signals connect to the output differential amplifier Y5. The input signal to differential amplifier Y5 can be a differential or common-mode signal. This input signal to differential amplifier Y5 connects to the output O5 of cross-point switch SW.

Path P6 input differential signals connect to the input differential amplifier A6. The output signal from differential amplifier A6 can be a differential or common-mode signal. This output signal from differential amplifier A6 connects to the input of retimer RT6. The output of retimer RT6 connects to input I6 of the cross-point switch SW.

Path P7 output differential signals connect to the output differential amplifier Y7. The input signal to differential amplifier Y7 can be a differential or common-mode signal. This input signal to differential amplifier Y7 connects to the output O7 of cross-point switch SW.

Path P8 input differential signals connect to the input differential amplifier A8. The output signal from differential amplifier A8 can be a differential or common-mode signal. This output signal from differential amplifier A8 connects to the input of retimer RT8. The output of retimer RT8 connects to input I8 of the cross-point switch SW.

Path P9 output differential signals connect to the output differential amplifier Y9. The input signal to differential amplifier Y9 can be a differential or common-mode signal. This input signal to differential amplifier Y9 connects to the output O9 of cross-point switch SW.

Path P10 input differential signals connect to the input differential amplifier A10. The output signal from differential amplifier A10 can be a differential or common-mode signal. This output signal from differential amplifier A10 connects to the input of retimer RT10. The output of retimer RT10 connects to input I10 of the cross-point switch SW.

Path P11 output differential signals connect to the output differential amplifier Y11. The input signal to differential amplifier Y1 can be a differential or common-mode signal. This input signal to differential amplifier Y11 connects to the output O11 of cross-point switch SW.

Path P12 input differential signals connect to the input differential amplifier A12. The output signal from differential amplifier A12 can be a differential or common-mode signal. This output signal from differential amplifier A12 connects to the input of retimer RT12. The output of retimer RT12 connects to input I12 of the cross-point switch SW.

Path P13 output differential signals connect to the output differential amplifier Y13. The input signal to differential amplifier Y13 can be a differential or common-mode signal. This input signal to differential amplifier Y13 connects to the output O13 of cross-point switch SW.

Path P14 input differential signals connect to the input differential amplifier A14. The output signal from differential amplifier A14 can be a differential or common-mode signal. This output signal from differential amplifier A14 connects to the input of retimer RT14. The output of retimer RT14 connects to input I14 of the cross-point switch SW.

Path P15 output differential signals connect to the output differential amplifier Y15. The input signal to differential amplifier Y15 can be a differential or common-mode signal. This input signal to differential amplifier Y15 connects to the output O15 of cross-point switch SW.

Path P16 input differential signals connect to the input differential amplifier A16. The output signal from differential amplifier A16 can be a differential or common-mode signal. This output signal from differential amplifier A16 connects to the input of retimer RT16. The output of retimer RT16 connects to input I16 of the cross-point switch SW.

Path P17 output differential signals connect to the output differential amplifier Y16. The input signal to differential amplifier Y16 can be a differential or common-mode signal. This input signal to differential amplifier Y16 connects to the output O16 of cross-point switch SW.

Path P18 input differential signals connect to the input differential amplifier A15. The output signal from differential amplifier A15 can be a differential or common-mode signal. This output signal from differential amplifier A15 connects to the input of the retimer RT15. The output of the retimer RT15 connects to the input I15 of the cross-point switch SW.

Path P19 output differential signals connect to the output differential amplifier Y14. The input signal to differential amplifier Y14 can be a differential or common-mode signal. This input signal to differential amplifier Y14 connects to the output O14 of cross-point switch SW.

Path P20 input differential signals connect to the input differential amplifier A13. The output signal from differential amplifier A13 can be a differential or common-mode signal. This output signal from differential amplifier A13 connects to the input of the retimer RT13. The output of the retimer RT13 connects to the input I13 of the cross-point switch SW.

Path P21 output differential signals connect to the output differential amplifier Y12. The input signal to differential amplifier Y12 can be a differential or common-mode signal. This input signal to differential amplifier Y12 connects to the output O12 of cross-point switch SW.

Path P22 input differential signals connect to the input differential amplifier A11. The output signal from differential amplifier A11 can be a differential or common-mode signal. This output signal from differential amplifier A11 connects to the input of the retimer RT11. The output of the retimer RT11 connects to the input I11 of the cross-point switch SW.

Path P23 output differential signals connect to the output differential amplifier Y10. The input signal to differential amplifier Y10 can be a differential or common-mode signal. This input signal to differential amplifier Y10 connects to the output O10 of cross-point switch SW.

Path P24 input differential signals connect to the input differential amplifier A9. The output signal from differential amplifier A9 can be a differential or common-mode signal. This output signal from differential amplifier A9 connects to the input of the retimer RT9. The output of the retimer RT9 connects to the input I9 of the cross-point switch SW.

Path P25 output differential signals connect to the output differential amplifier Y8. The input signal to differential amplifier Y8 can be a differential or common-mode signal. This input signal to differential amplifier Y8 connects to the output O8 of cross-point switch SW.

Path P26 input differential signals connect to the input differential amplifier A7. The output signal from differential amplifier A7 can be a differential or common-mode signal. This output signal from differential amplifier A7 connects to the input of the retimer RT7. The output of the retimer RT7 connects to the input I7 of the cross-point switch SW.

Path P27 output differential signals connect to the output differential amplifier Y6. The input signal to differential amplifier Y6 can be a differential or common-mode signal. This input signal to differential amplifier Y6 connects to the output O6 of cross-point switch SW.

Path P28 input differential signals connect to the input differential amplifier A5. The output signal from differential amplifier A5 can be a differential or common-mode signal. This output signal from differential amplifier A5 connects to the input of the retimer RT5. The output of the retimer RT5 connects to the input I5 of the cross-point switch SW.

Path P29 output differential signals connect to the output differential amplifier Y4. The input signal to differential amplifier Y4 can be a differential or common-mode signal. This input signal to differential amplifier Y4 connects to the output O4 of cross-point switch SW.

Path P30 input differential signals connect to the input differential amplifier A3. The output signal from differential amplifier A3 can be a differential or common-mode signal. This output signal from differential amplifier A3 connects to the input of the retimer RT3. The output of the retimer RT3 connects to the input I3 of the cross-point switch SW.

Path P31 output differential signals connect to the output differential amplifier Y2. The input signal to differential amplifier Y2 can be a differential or common-mode signal. This input signal to differential amplifier Y2 connects to the output O2 of cross-point switch SW.

Path P32 input differential signals connect to the input differential amplifier A1. The output signal from differential amplifier A1 can be a differential or common-mode signal. This output signal from differential amplifier A1 connects to the input of the retimer RT1. The output of the retimer RT1 connects to the input I1 of the cross-point switch SW.

FIG. 20 illustrates a schematic diagram of one embodiment of the Circuitry 150f of the present disclosure, representing for example a communication Device 100f with a plurality of Port connectors 102b, 104b, and 140b, which are each connected to an input and output differential amplifier, wherein the differential amplifier connects to a retimer. As shown in FIG. 21, the communication Device 100f two port connectors Port 102b and Port 104b also correspondingly represented as Port 1 and Port 2 respectively, are each configured to interface eight differential signal paths, specifically four transmit and receive differential signal paths to a Network. The communication Device 100f connector Port 140b also represented as Port 3 is configured to interface sixteen differential signal paths, specifically eight transmit and receive differential signal paths, to a Network. Further, in use, a QSFP Device as described above is inserted into Port 102b and Port 104b and a QSFP-DD Device as described above is inserted into Port 140b. The QSFP-DD and QSFP Devices connect to one or more cables as described above. The QSFP-DD and QSFP Device can be alternatively replaced by various other derivatives of QSFP-DD and QSFP Devices, respectively.

More specifically, FIG. 21 illustrates a diagram of Circuitry 150f of the present disclosure involving three Ports and thirty two differential signal paths. Port 1 has eight differential signal paths P1, P2, P3, P4, P5, P6, P7, and P8, represented as 602. Port 2 has eight differential signal paths P9, P10, P11, P12, P13, P14, P15, and P16, represented as 604. Port 3 has sixteen differential signal paths P17, P18, P19, P20, P21, P22, P23, P24, P25, P26, P27, P28, P29, P30, P31, and P32, represented as 600.

As illustrated in FIG. 21, there are sixteen input broadband differential amplifiers A1, A2, A3, A4, A5, A6, A7, A8, A9, A10, A11, A12, A13, A14, A15, and A16, represented collectively as 156e. The broadband differential amplifiers provide amplification and conditioning of the input signal. There are sixteen retimers RT1, RT2, RT3, RT4, RT5, RT6, RT7, RT8, RT9, RT10, RT11, RT12, RT13, RT14, RT15, and RT16, represented collectively as 154e. The retimers extract timing from the input signals and retransmit the signal with a corrected timing. The retimer removes jitter and intersymbol interference from the input signal. There are sixteen high speed output differential amplifiers Y1, Y2, Y3, Y4, Y5, Y6, Y7, Y8, Y9, Y10, Y11, Y12, Y13, Y14, Y15, and Y16, represented collectively as 152e. The high speed output differential amplifiers provide fixed or variable output voltages with and without pre-emphasis. Highly integrated circuits (IC) incorporate the input broadband differential amplifiers, retimers, and the output broadband differential amplifiers. Low latency of 350 ps and lower are achieved with using differential signal paths between the input differential amplifiers A, the output differential amplifiers Y, and the retimers RT.

Port 1 comprises a path P1 representing an output differential signal, a path P2 representing an input differential signal, a path P3 representing an output differential signal, a path P4 representing an input differential signal, a path P5 representing an output differential signal, a path P6 representing an input differential signal, a path P7 representing an output differential signal, and a path P8 representing an input differential signal. Port 2 comprises a path P9 representing an output differential signal, a path P10 representing an input differential signal, a path P11 representing an output differential signal, a path P12 representing an input differential signal, a path P13 representing an output differential signal, a path P14 representing an input differential signal, a path P15 representing an output differential signal, and a path P16 representing an input differential signal. Port 3 comprises a path P17 representing an output differential signal, a path P18 representing an input differential signal, a path P19 representing an output differential signal, a path P20 representing an input differential signal, a path P21 representing an output differential signal, a path P22 representing an input differential signal, a path P23 representing an output differential signal, and a path P24 representing an input differential signal, a path P25 representing an output differential signal, a path P26 representing an input differential signal, a path P27 representing an output differential signal, a path P28 representing an input differential signal, a path P29 representing an output differential signal, a path P30 representing an input differential signal, a path P31 representing an output differential signal, and a path P32 representing an input differential signal.

Path P1 output differential signals connect to the output differential amplifier Y1. The input signal to differential amplifier Y1 can be a differential or common-mode signal. This input signal to differential amplifier Y1 connects to the output of retimer RT1.

Path P2 input differential signals connect to the input differential amplifier A2. The output signal from differential amplifier A2 can be a differential or common-mode signal. This output signal from differential amplifier A2 connects to the input of retimer RT2.

Path P3 output differential signals connect to the output differential amplifier Y3. The input signal to differential amplifier Y3 can be a differential or common-mode signal. This input signal to differential amplifier Y3 connects to the output of retimer RT3.

Path P4 input differential signals connect to the input differential amplifier A4. The output signal from differential amplifier A4 can be a differential or common-mode signal. This output signal from differential amplifier A4 connects to the input of retimer RT4.

Path P5 output differential signals connect to the output differential amplifier Y5. The input signal to differential amplifier Y5 can be a differential or common-mode signal. This input signal to differential amplifier Y5 connects to the output of retimer RT5.

Path P6 input differential signals connect to the input differential amplifier A6. The output signal from differential amplifier A6 can be a differential or common-mode signal. This output signal from differential amplifier A6 connects to the input of retimer RT6.

Path P7 output differential signals connect to the output differential amplifier Y7. The input signal to differential amplifier Y7 can be a differential or common-mode signal. This input signal to differential amplifier Y7 connects to the output of retimer RT7.

Path P8 input differential signals connect to the input differential amplifier A8. The output signal from differential amplifier A8 can be a differential or common-mode signal. This output signal from differential amplifier A8 connects to the input of retimer RT8.

Path P9 output differential signals connect to the output differential amplifier Y9. The input signal to differential amplifier Y9 can be a differential or common-mode signal. This input signal to differential amplifier Y9 connects to the output of retimer RT9.

Path P10 input differential signals connect to the input differential amplifier A10. The output signal from differential amplifier A10 can be a differential or common-mode signal. This output signal from differential amplifier A10 connects to the input of retimer RT10.

Path P11 output differential signals connect to the output differential amplifier Y11. The input signal to differential amplifier Y11 can be a differential or common-mode signal. This input signal to differential amplifier Y11 connects to the output of retimer RT11.

Path P12 input differential signals connect to the input differential amplifier A12. The output signal from differential amplifier A12 can be a differential or common-mode signal. This output signal from differential amplifier A12 connects to the input of retimer RT12.

Path P13 output differential signals connect to the output differential amplifier Y13. The input signal to differential amplifier Y13 can be a differential or common-mode signal. The input signal to differential amplifier Y13 connects to the output of retimer RT13.

Path P14 input differential signals connect to the input differential amplifier A14. The output signal from differential amplifier A14 can be a differential or common-mode signal. This output signal from differential amplifier A14 connects to the input of retimer RT14.

Path P15 output differential signals connect to the output differential amplifier Y15. The input signal to differential amplifier Y15 can be a differential or common-mode signal. This input signal to differential amplifier Y15 connects to the output of retimer RT15.

Path P16 input differential signals connect to the input differential amplifier A16. The output signal from differential amplifier A16 can be a differential or common-mode signal. This output signal from differential amplifier A16 connects to the input of retimer RT16.

Path P17 output differential signals connect to the output differential amplifier Y16. The input signal to differential amplifier Y16 can be a differential or common-mode signal. This input signal to differential amplifier Y16 connects to the output of retimer RT16.

Path P18 input differential signals connect to the input differential amplifier A15. The output signal from differential amplifier A15 can be a differential or common-mode signal. This output signal from differential amplifier A15 connects to the input of retimer RT15.

Path P19 output differential signals connect to the output differential amplifier Y14. The input signal to differential amplifier Y14 can be a differential or common-mode signal. This input signal to differential amplifier Y14 connects to the output of retimer RT14.

Path P20 input differential signals connect to the input differential amplifier A13. The output signal from differential amplifier A13 can be a differential or common-mode signal. This output signal from differential amplifier A13 connects to the input of retimer RT13.

Path P21 output differential signals connect to the output differential amplifier Y12. The input signal to differential amplifier Y12 can be a differential or common-mode signal. This input signal to differential amplifier Y12 connects to the output of retimer RT12.

Path P22 input differential signals connect to the input differential amplifier A11. The output signal from differential amplifier A11 can be a differential or common-mode signal. This output signal from differential amplifier A11 connects to the input of retimer RT11.

Path P23 output differential signals connect to the output differential amplifier Y10. The input signal to differential amplifier Y10 can be a differential or common-mode signal. This input signal to differential amplifier Y10 connects to the output of retimer RT10.

Path P24 input differential signals connect to the input differential amplifier A9. The output signal from differential amplifier A9 can be a differential or common-mode signal. This output signal from differential amplifier A9 connects to the input of retimer RT9.

Path P25 output differential signals connect to the output differential amplifier Y8. The input signal to differential amplifier Y8 can be a differential or common-mode signal. This input signal to differential amplifier Y8 connects to the output of retimer RT8.

Path P26 input differential signals connect to the input differential amplifier A7. The output signal from differential amplifier A7 can be a differential or common-mode signal. This output signal from differential amplifier A7 connects to the input of retimer RT7.

Path P27 output differential signals connect to the output differential amplifier Y6. The input signal to differential amplifier Y6 can be a differential or common-mode signal. This input signal to differential amplifier Y6 connects to the output of retimer RT6.

Path P28 input differential signals connect to the input differential amplifier A5. The output signal from differential amplifier A5 can be a differential or common-mode signal. This output signal from differential amplifier A5 connects to the input of retimer RT5.

Path P29 output differential signals connect to the output differential amplifier Y4. The input signal to differential amplifier Y4 can be a differential or common-mode signal. The input signal to differential amplifier Y4 connects to the output of retimer RT4.

Path P30 input differential signals connect to the input differential amplifier A3. The output signal from differential amplifier A3 can be a differential or common-mode signal. This output signal from differential amplifier A3 connects to the input of retimer RT3.

Path P31 output differential signals connect to the output differential amplifier Y2. The input signal to differential amplifier Y2 can be a differential or common-mode signal. This input signal to differential amplifier Y2 connects to the output of retimer RT2.

Path P32 input differential signals connect to the input differential amplifier A1. The output signal from differential amplifier A1 can be a differential or common-mode signal. This output signal from differential amplifier A1 connects to the input of retimer RT1.

FIG. 21 illustrates a diagram of one embodiment of the Circuitry 150g of the present disclosure, representing for example a communication Device 100g with a plurality of Port connectors 102b, 104b, and 140b, which are each connected to an input and output differential amplifier, wherein the input differential amplifier connects to a cross-point switch, the cross-point switch connects to the retimer, and the retimers connect to the output differential amplifier. As shown in FIG. 21, the communication Device 100g two port connectors Port 102b and Port 104b also correspondingly represented as Port 1 and Port 2 respectively, are each configured to interface eight differential signal paths, specifically four transmit and receive differential signal paths to a Network. The communication Device 100g connector Port 140b also represented as Port 3 is configured to interface sixteen differential signal paths, specifically eight transmit and receive differential signal paths to a Network. Further, in use, a QSFP28 Device as described above is inserted into Port 102b and Port 104b and a QSFP-DD Device as described above is inserted into Port 140b. The QSFP-DD and QSFP28 Devices connect to one or more cables as described above. The QSFP-DD and QSFP28 Devices can be alternatively replaced by various other derivatives of QSFP-DD and QSFP28 Devices, respectively.

More specifically, FIG. 21 illustrates a diagram of Circuitry 150g of the present disclosure involving three Ports and thirty-two differential signal paths. Port 1 has eight differential signal paths P1, P2, P3, P4, P5, P6, P7, and P8, represented as 602. Port 2 has eight differential signal paths P9, P10, P11, P12, P13, P14, P15, and P16, represented as 604. Port 3 has sixteen differential signal paths P17, P18, P19, P20, P21, P22, P23, P24, P25, P26, P27, P28, P29, P30, P31, and P32, represented as 600.

As illustrated in FIG. 21, there are sixteen input broadband differential amplifiers A1, A2, A3, A4, A5, A6, A7, A8, A9, A10, A11, A12, A13, A14, A15, and A16, represented collectively as 156. The broadband differential amplifiers provide amplification and conditioning of the input signal. There are sixteen retimers RT1, RT2, RT3, RT4, RT5, RT6, RT7, RT8, RT9, RT10, RT11, RT12, RT13, RT14, RT15, and RT16, represented collectively as 154. The retimers extract timing from the input signals and retransmit the signal with a corrected timing. The retimer removes jitter and intersymbol interference from the input signal. There is a 16×16 non-blocking cross-point switch SW, represented as 158*b*. The 16×16 non-blocking cross-point Switch 158*b* allows any output O to be connected to any input I of the switch SW. There are sixteen high speed output differential amplifiers Y1, Y2, Y3, Y4, Y5, Y6, Y7, Y8, Y9, Y10, Y11, Y12, Y13, Y14, Y15, and Y16, represented collectively as 152. The high speed output differential amplifiers provide fixed or variable output voltages with and without pre-emphasis. Highly integrated circuits (IC) incorporate the input broadband differential amplifiers, retimers, and the output broadband differential amplifiers. Low latency of 350 ps and lower are achieved with using differential signal paths between the input differential amplifiers A, the output differential amplifiers Y, the retimers RT, and the cross-point switch SW.

Port 1 comprises a path P11 representing an output differential signal, a path P2 representing an input differential signal, a path P3 representing an output differential signal, a path P4 representing an input differential signal, a path P5 representing an output differential signal, a path P6 representing an input differential signal, a path P7 representing an output differential signal, and a path P8 representing an input differential signal. Port 2 comprises a path P9 representing an output differential signal, a path P10 representing an input differential signal, a path P11 representing an output differential signal, a path P12 representing an input differential signal, a path P13 representing an output differential signal, a path P14 representing an input differential signal, a path P15 representing an output differential signal, and a path P16 representing an input differential signal. Port 3 comprises a path P17 representing an output differential signal, a path P18 representing an input differential signal, a path P19 representing an output differential signal, a path P20 representing an input differential signal, a path P21 representing an output differential signal, a path P22 representing an input differential signal, a path P23 representing an output differential signal, and a path P24 representing an input differential signal, a path P25 representing an output differential signal, a path P26 representing an input differential signal, a path P27 representing an output differential signal, a path P28 representing an input differential signal, a path P29 representing an output differential signal, a path P30 representing an input differential signal, a path P31 representing an output differential signal, and a path P32 representing an input differential signal.

Path P1 output differential signals connect to the output differential amplifier Y1. The input signal to differential amplifier Y1 can be a differential or common-mode signal. This input signal to differential amplifier Y1 connects to the output O1 of cross-point switch SW.

Path P2 input differential signals connect to the input differential amplifier A2. The output signal from differential amplifier A2 can be a differential or common-mode signal. This output signal from differential amplifier A2 connects to the input of retimer RT2. The output of retimer RT2 connects to input I2 of the cross-point switch SW.

Path P3 output differential signals connect to the output differential amplifier Y3. The input signal to differential amplifier Y3 can be a differential or common-mode signal. This input signal to differential amplifier Y1 connects to the output O3 of cross-point switch SW.

Path P4 input differential signals connect to the input differential amplifier A4. The output signal from differential amplifier A4 can be a differential or common-mode signal. This output signal from differential amplifier A4 connects to the input of retimer RT4. The output of retimer RT4 connects to input I4 of the cross-point switch SW.

Path P5 output differential signals connect to the output differential amplifier Y5. The input signal to differential amplifier Y5 can be a differential or common-mode signal. This input signal to differential amplifier Y5 connects to the output O5 of cross-point switch SW.

Path P6 input differential signals connect to the input differential amplifier A6. The output signal from differential amplifier A6 can be a differential or common-mode signal. This output signal from differential amplifier A6 connects to the input of retimer RT6. The output of retimer RT6 connects to input I6 of the cross-point switch SW.

Path P7 output differential signals connect to the output differential amplifier Y7. The input signal to differential amplifier Y7 can be a differential or common-mode signal. This input signal to differential amplifier Y7 connects to the output O7 of cross-point switch SW.

Path P8 input differential signals connect to the input differential amplifier A8. The output signal from differential amplifier A8 can be a differential or common-mode signal. This output signal from differential amplifier A8 connects to the input of retimer RT8. The output of retimer RT8 connects to input I8 of the cross-point switch SW.

Path P9 output differential signals connect to the output differential amplifier Y9. The input signal to differential amplifier Y9 can be a differential or common-mode signal. This input signal to differential amplifier Y9 connects to the output O9 of cross-point switch SW.

Path P10 input differential signals connect to the input differential amplifier A10. The output signal from differential amplifier A10 can be a differential or common-mode signal. This output signal from differential amplifier A10 connects to the input of retimer RT10. The output of retimer RT10 connects to input I10 of the cross-point switch SW.

Path P11 output differential signals connect to the output differential amplifier Y11. The input signal to differential amplifier Y11 can be a differential or common-mode signal. This input signal to differential amplifier Y11 connects to the output O11 of cross-point switch SW.

Path P12 input differential signals connect to the input differential amplifier A12. The output signal from differential amplifier A12 can be a differential or common-mode signal. This output signal from differential amplifier A12 connects to the input of retimer RT12. The output of retimer RT12 connects to input I12 of the cross-point switch SW.

Path P13 output differential signals connect to the output differential amplifier Y13. The input signal to differential amplifier Y13 can be a differential or common-mode signal. This input signal to differential amplifier Y13 connects to the output O13 of cross-point switch SW.

Path P14 input differential signals connect to the input differential amplifier A14. The output signal from differential amplifier A14 can be a differential or common-mode signal. This output signal from differential amplifier A14 connects to the input of retimer RT14. The output of retimer RT14 connects to input I14 of the cross-point switch SW.

Path P15 output differential signals connect to the output differential amplifier Y15. The input signal to differential amplifier Y15 can be a differential or common-mode signal. This input signal to differential amplifier Y15 connects to the output O15 of cross-point switch SW.

Path P16 input differential signals connect to the input differential amplifier A16. The output signal from differential amplifier A16 can be a differential or common-mode signal. This output signal from differential amplifier A16 connects to the input of retimer RT16. The output of retimer RT16 connects to input I16 of the cross-point switch SW.

Path P17 output differential signals connect to the output differential amplifier Y16. The input signal to differential amplifier Y16 can be a differential or common-mode signal. This input signal to differential amplifier Y16 connects to the output O16 of cross-point switch SW.

Path P18 input differential signals connect to the input differential amplifier A15. The output signal from differential amplifier A15 can be a differential or common-mode signal. This output signal from differential amplifier A15 connects to the input of the retimer RT15. The output of the retimer RT15 connects to the input I15 of the cross-point switch SW.

Path P19 output differential signals connect to the output differential amplifier Y14. The input signal to differential amplifier Y14 can be a differential or common-mode signal. This input signal to differential amplifier Y14 connects to the output O14 of cross-point switch SW.

Path P20 input differential signals connect to the input differential amplifier A13. The output signal from differential amplifier A13 can be a differential or common-mode signal. This output signal from differential amplifier A13 connects to the input of the retimer RT13. The output of the retimer RT13 connects to the input I13 of the cross-point switch SW.

Path P21 output differential signals connect to the output differential amplifier Y12. The input signal to differential amplifier Y12 can be a differential or common-mode signal. This input signal to differential amplifier Y12 connects to the output O12 of cross-point switch SW.

Path P22 input differential signals connect to the input differential amplifier A11. The output signal from differential amplifier A11 can be a differential or common-mode signal. This output signal from differential amplifier A11 connects to the input of the retimer RT11. The output of the retimer RT11 connects to the input I11 of the cross-point switch SW.

Path P23 output differential signals connect to the output differential amplifier Y10. The input signal to differential amplifier Y10 can be a differential or common-mode signal. This input signal to differential amplifier Y10 connects to the output O10 of cross-point switch SW.

Path P24 input differential signals connect to the input differential amplifier A9. The output signal from differential amplifier A9 can be a differential or common-mode signal. This output signal from differential amplifier A9 connects to the input of the retimer RT9. The output of the retimer RT9 connects to the input I9 of the cross-point switch SW.

Path P25 output differential signals connect to the output differential amplifier Y8. The input signal to differential amplifier Y8 can be a differential or common-mode signal. This input signal to differential amplifier Y8 connects to the output O8 of cross-point switch SW.

Path P26 input differential signals connect to the input differential amplifier A7. The output signal from differential amplifier A7 can be a differential or common-mode signal. This output signal from differential amplifier A7 connects to the input of the retimer RT7. The output of the retimer RT7 connects to the input I7 of the cross-point switch SW.

Path P27 output differential signals connect to the output differential amplifier Y6. The input signal to differential amplifier Y6 can be a differential or common-mode signal. This input signal to differential amplifier Y6 connects to the output O6 of cross-point switch SW.

Path P28 input differential signals connect to the input differential amplifier A5. The output signal from differential amplifier A5 can be a differential or common-mode signal. This output signal from differential amplifier A5 connects to the input of the retimer RT5. The output of the retimer RT5 connects to the input I5 of the cross-point switch SW.

Path P29 output differential signals connect to the output differential amplifier Y4. The input signal to differential amplifier Y4 can be a differential or common-mode signal. This input signal to differential amplifier Y4 connects to the output O4 of cross-point switch SW.

Path P30 input differential signals connect to the input differential amplifier A3. The output signal from differential amplifier A3 can be a differential or common-mode signal. This output signal from differential amplifier A3 connects to the input of the retimer RT3. The output of the retimer RT3 connects to the input I3 of the cross-point switch SW.

Path P31 output differential signals connect to the output differential amplifier Y2. The input signal to differential amplifier Y2 can be a differential or common-mode signal. This input signal to differential amplifier Y2 connects to the output O2 of cross-point switch SW.

Path P32 input differential signals connect to the input differential amplifier A1. The output signal from differential amplifier A1 can be a differential or common-mode signal. This output signal from differential amplifier A1 connects to the input of the retimer RT1. The output of the retimer RT1 connects to the input I1 of the cross-point switch SW.

Figure 22:
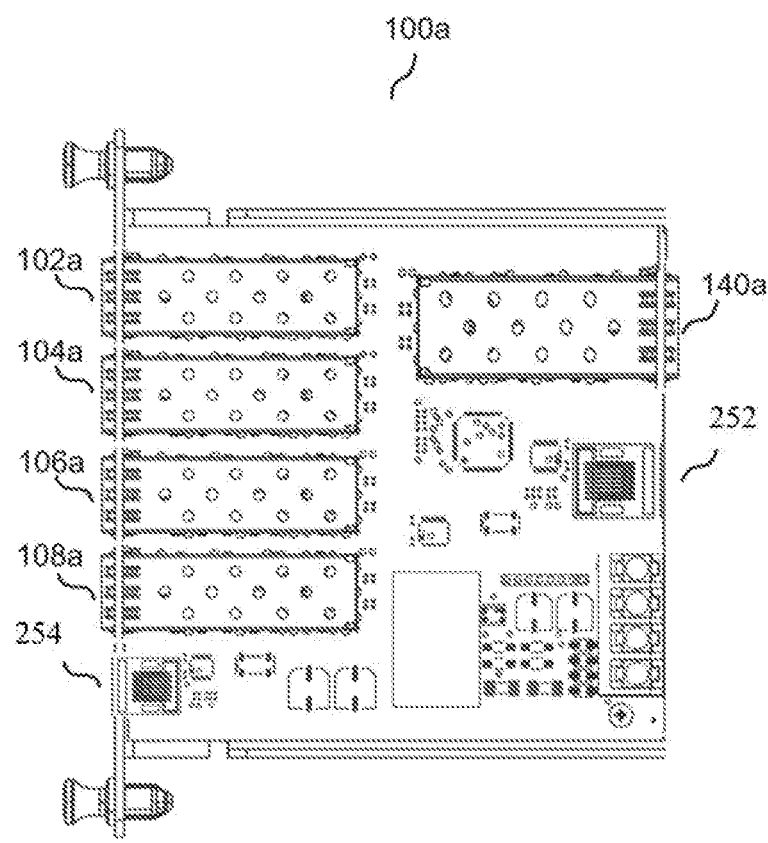
FIG. 22 is a diagram illustrating a graphical representation of one embodiment of the Device of the present disclosure and illustrating security on the QSFP device.

FIG. 22 illustrates a graphical representation of an embodiment of the communications system and equipment of the present disclosure. Device 100a having four Ports 102a, 104a, 106a, and 108a where each port support an SFP+ device and a Port 140a that support a QSFP+. Port 140a is positioned at the rear of the Device 100a to provide security for the QSFP+ device, the cabling, and the communication services. The rear placement of the Port 140a prevents unauthorized access to the QSFP+ device and cabling.

The Ethernet Management Port 252 provides remote or local Ethernet communications to the Device 100a for status, performance monitor, testing, and provisioning on the SFP+ and QSFP+ devices and Device 100a.

The Craft Interface Port 254 provides local RS232 serial communications to the Device 100a for status, performance monitor, testing, and provisioning on the SFP+ and QSFP+ devices and Device 100a.

While the embodiment(s) disclosed herein are illustrative of the structure, function and operation of the exemplary methods, systems, devices, circuitry, and equipment, it should be understood that various modifications may be made thereto with departing from the teachings herein. Further, the components of the methods, systems, devices, circuitry and equipment disclosed herein can take any suitable form, including any suitable hardware, software, circuitry or other components capable of adequately performing their respective intended functions, as may be known in the art.

While the foregoing discussion presents the teachings in an exemplary fashion with respect to the disclosed methods, systems, devices, circuitry and equipment for communication services, it will be apparent to those skilled in the art that the present disclosure may apply to other methods, systems, devices, circuitry and equipment for communication services. Further, while the foregoing has described what are considered to be the best mode and/or other examples, it is understood that various modifications may be made therein and that the subject matter disclosed herein may be implemented in various forms and examples, and that the methods, systems, devices, equipment and circuitry may be applied in numerous applications, only some of which have been described herein.

What is claimed is:

1. A device for communication service, comprising:
   circuitry on the device, wherein the circuitry includes a plurality of input amplifiers, a plurality of output amplifiers, and a plurality of retimers;
   a plurality of ports, wherein the plurality of ports is connected to the circuitry;
   a plurality of Small Form-factor Pluggable (SFP) devices in the plurality of ports, wherein the plurality of SFP devices each interface a communication service to the device;
   wherein the device is adapted to aggregate communication services from a plurality of lower service capacity connectors and interfaces to a single higher capacity connector and interface;
   wherein the circuitry further includes a non-blocking cross-point switch;
   wherein the plurality of ports includes a plurality of SFP ports and a single Quad Small Form-factor Pluggable (QSFP) port.

2. The device of claim 1, wherein a SFP device is connected to each of the SFP ports, and a QSFP device is connected to the QSFP port.

3. The device of claim 1, wherein the plurality of SFP ports each establish two differential signal paths.

4. The device of claim 1, wherein the QSFP port establishes eight differential signal paths.

5. The device of claim 1, wherein the QSFP port establishes sixteen differential signal paths.

6. The device of claim 1, wherein the plurality of ports includes a plurality of QSFP ports and a single QSFP-Double Density (DD) port.

7. The device of claim 6, wherein a QSFP device is connected to each of the QSFP ports, and a QSFP-DD device is connected to the QSFP-DD port.

8. The device of claim 6, wherein the plurality of QSFP ports each establish eight differential signal paths.

9. The device of claim 6, wherein the QSFP-DD port establishes sixteen differential signal paths.

10. A system for communication service, comprising:
    a first communication network;
    a second communication network;
    a communication device on the first network, wherein the communication device comprises a plurality of ports connected to circuitry having a plurality of input amplifiers, a plurality of output amplifiers, and a plurality of retimers;
    a plurality of Small Form-factor Pluggable (SFP) devices connected in the plurality of ports;
    a communication service interfaced to each of the plurality of SFP devices;
    wherein the system is adapted to aggregate communication services from a plurality of lower service capacity connectors and interfaces to a single higher capacity connector and interface;
    wherein the circuitry further includes a non-blocking cross-point switch; and
    wherein the plurality of ports includes a plurality of SFP ports each having a SFP device connected therein and a single Quad Small Form-factor Pluggable (QSFP) port having a QSFP device connected therein.

11. The system of claim 10, wherein the plurality of SFP ports each establish two differential signal paths.

12. The system of claim 10, wherein the QSFP port establishes one of eight differential signal paths and sixteen differential signal paths.

13. The system of claim 10, wherein the plurality of ports includes a plurality of QSFP ports each having a QSFP device connected therein and a single QSFP-DD port having a QSFP-Double Density (DD) device connected therein.

14. The system of claim 13, wherein the plurality of QSFP ports each establish eight differential signal paths.

15. The system of claim 13, wherein the QSFP-DD port establishes sixteen differential signal paths.

16. A method for communication service, comprising:
    providing a communication device comprising a plurality of Small Form-factor Pluggable (SFP) ports, a single Quad Small Form-factor Pluggable (QSFP) port, and circuitry connected to the plurality of SFP ports and the QSFP port, wherein the circuitry includes a plurality of input amplifiers, a plurality of output amplifiers, a plurality of retimers, and a non-blocking cross-point switch;
    interfacing first network communication equipment with the plurality of SFP ports by inserting a SFP device into each of the plurality of SFP ports, and connecting each of the SFP devices to the first network communication equipment;
    interfacing second network communication equipment with the QSFP port by inserting a QSFP device into the QSFP port, and connecting the QSFP device to the second network communication equipment;
    aggregating communication services from a plurality of lower service capacity connectors and interfaces to a single higher capacity connector and interface;
    switching an unconnected input path from one of the plurality of SFP ports to an unconnected output path of the QSFP port; and
    switching an unconnected output path from one of the plurality of SFP ports to an unconnected input path of the QSFP port.

* * * * *